United States Patent
Matsuno et al.

(10) Patent No.: US 7,180,961 B2
(45) Date of Patent: Feb. 20, 2007

(54) RECEIVING DEVICE

(75) Inventors: Kazuhiko Matsuno, Tokyo (JP); Masayuki Kashima, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 793 days.

(21) Appl. No.: 10/369,499

(22) Filed: Feb. 21, 2003

(65) Prior Publication Data

US 2003/0161389 A1    Aug. 28, 2003

(30) Foreign Application Priority Data

Feb. 25, 2002   (JP) ............................ 2002-048176

(51) Int. Cl.
*H04B 1/00* (2006.01)
*H03K 9/00* (2006.01)
*H04L 27/00* (2006.01)
*H04L 27/06* (2006.01)
*H03D 1/00* (2006.01)

(52) U.S. Cl. .................. 375/316; 375/142; 375/150; 375/343

(58) Field of Classification Search ............ 375/142–3, 375/150–3, 320, 343; 367/100; 708/314; 359/306

See application file for complete search history.

(56) References Cited

U.S. PATENT DOCUMENTS 5,138,632 A * 8/1992 Uchida ..................... 375/343
5,719,900 A * 2/1998 Dixon et al. ............... 375/150
5,910,948 A * 6/1999 Shou et al. ................ 370/335
6,574,268 B1 * 6/2003 Bergamo ................... 375/142

OTHER PUBLICATIONS

Peterson, Courtney; How it Works: The Charge-Coupled Device, or CCD; The Journal of Young Investigators, vol. 3 Issue 1, Mar. 2001.*

* cited by examiner

*Primary Examiner*—Khai Tran
*Assistant Examiner*—Aslan Ettehadieh
(74) *Attorney, Agent, or Firm*—Rabin & Berdo, P.C.

(57) ABSTRACT

The receiving device of the invention contains a correlational operation unit that executes a correlational operation between a first modulated signal having a spread-spectrum modulation applied and a first spread-spectrum signal string to output a correlational signal, and a decision circuit that decides an amplitude value of the correlational signal to output a decision signal. The decision circuit is composed of: a first detector that outputs a first detection signal when it detects that a value of the first correlational signal exceeds the first threshold, a second detector that outputs a second detection signal when it detects that the value of the first correlational signal exceeds the second threshold, and a detected signal selector that outputs the decision signal of a first value when the first detection signal is inputted, and outputs the decision signal of a second value when the second detection signal is inputted.

8 Claims, 14 Drawing Sheets dulates the second modulated signal 8 and the third modulated signal 11 by using the first spread-spectrum signal string.

RECEIVING DEVICE

FIELD OF THE INVENTION

The present invention relates to a receiving device that demodulates a modulated signal having the spread-spectrum modulation applied by using a spread-spectrum signal string (spread-spectrum code).

BACKGROUND OF THE INVENTION

The data receiving system used in the Spread Spectrum communication system or the Code Division Multiple Access communication system uses at present a matched filter, sliding correlator, or the like. When a receiving device uses a matched filter, the output signal is given by analog values; accordingly, the receiving device needs an analog/digital converter (A/D converter).

When the data transfer rate of a modulated signal is as high as several gigabits/second (several G bps), the highest processing rate of the A/D converter at present is about 100 MHz. Therefore, if it is intended to execute an A/D conversion to the analog signal of several GHz, lots of A/D converters have to be used in parallel. This consequently expands the circuit scale of the receiving device and so forth, which is a problem to be solved.

SUMMARY OF THE INVENTION

The present invention has been made in view of the above problem. An object of the invention is to provide a receiving device having a circuit configuration comprising a first detector, second detector, and detected signal selector for processing the output level from a correlator according to the threshold value decision processing, to thereby save an A/D converter. As the result, the invention intends to provide a technique capable of decreasing the scale of the receiving device compared with the conventional, without deteriorating the performance of the receiving device.

In order to solve the above problem, the receiving device of the invention provides the following construction.

The receiving device of the invention receives a first modulated signal having a spread-spectrum modulation applied, and outputs a decision signal. The receiving device include: a correlational operation circuit that executes a correlational operation between the first modulated signal and a first spread-spectrum signal string, and outputs a first correlational signal; and a decision circuit that decides an amplitude value of the first correlational signal, and outputs the decision signal. The decision circuit further includes: a first detector that outputs a first detection signal, when the first detector detects that a value of the first modulated signal exceeds a first threshold value; a second detector that outputs a second detection signal, when the second detector detects that a value of the second modulated signal exceeds a second threshold value; and a detected signal selector that outputs the decision signal of a first value, when the first detection signal is inputted, and outputs the decision signal of a second value, when the second detection signal is inputted.

DESCRIPTION OF THE PREFERRED EMBODIMENTS (A) First Embodiment

The receiving device relating to the first embodiment of the invention will be described in detail with reference to the accompanying drawings.

(A-1) Construction of the First Embodiment

Figure 1:
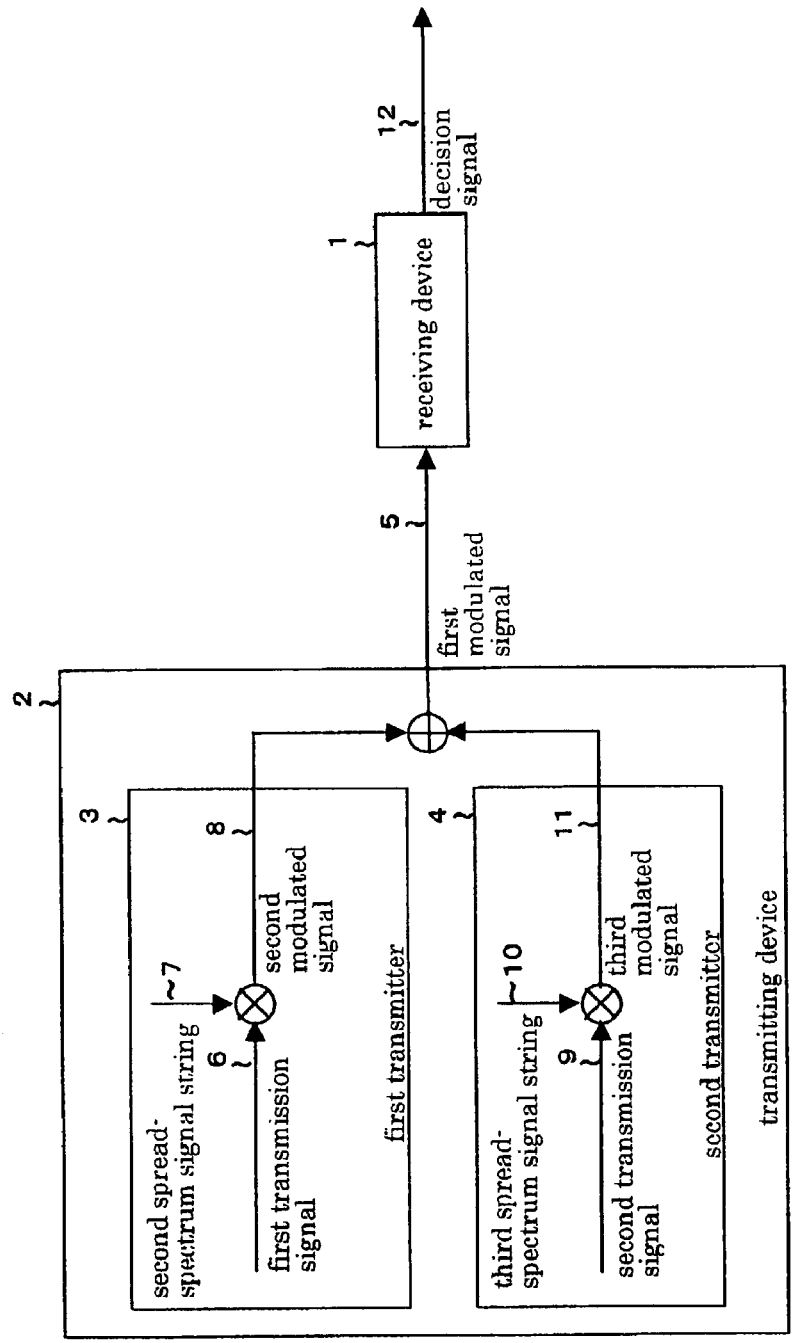
FIG. 1 is a block diagram illustrating the construction of a transmission/reception system of the first embodiment.

FIG. 1 illustrates the schematic construction of a transmission/reception system including the receiving device relating to the first embodiment. A receiving device 1 is to receive a modulated signal outputted from a transmitting device 2 composed of one or more transmitters. The receiving device 1 receives a first modulated signal 5 outputted from the transmitting device 2 composed of two transmitters (first transmitter 3, second transmitter 4), and the receiving device 1 demodulates the first modulated signal 5 by using a first spread-spectrum signal string. In the transmitting device 2, the first transmitter 3 modulates a first transmission signal 6 by using a second spread-spectrum signal string 7, and the first transmitter 3 outputs a modulated signal having the spread-spectrum modulation applied as a second modulated signal 8. The code sequence of the second spread-spectrum signal string 7 is regarded the same as the code sequence of the first spread-spectrum signal string. The second transmitter 4 modulates a second transmission signal 9 by using a third spread-spectrum signal string 10, and the second transmitter 4 outputs a modulated signal having the spread-spectrum modulation applied as a third modulated signal 11. The code sequence of the third spread-spectrum signal string 10 is regarded different from the code sequence of the first spread-spectrum signal string. The first modulated signal 5 outputted from the transmitting device 2 is a signal in which the second modulated signal 8 and the third modulated signal 11 are multiplexed. When the first modulated signal 5, the second modulated signal 8, and the third modulated signal 11 are transmitted through a wire system, the second modulated signal 8 and the third modulated signal 11 are multiplexed by using, for example, a multiplexer, adder, and so forth. The receiving device 1 demodulates the first modulated signal 5, and the receiving device 1 outputs a reception signal corresponding to the first transmission signal 6 of first transmitter 3, as a decision signal 12.

Figure 2:
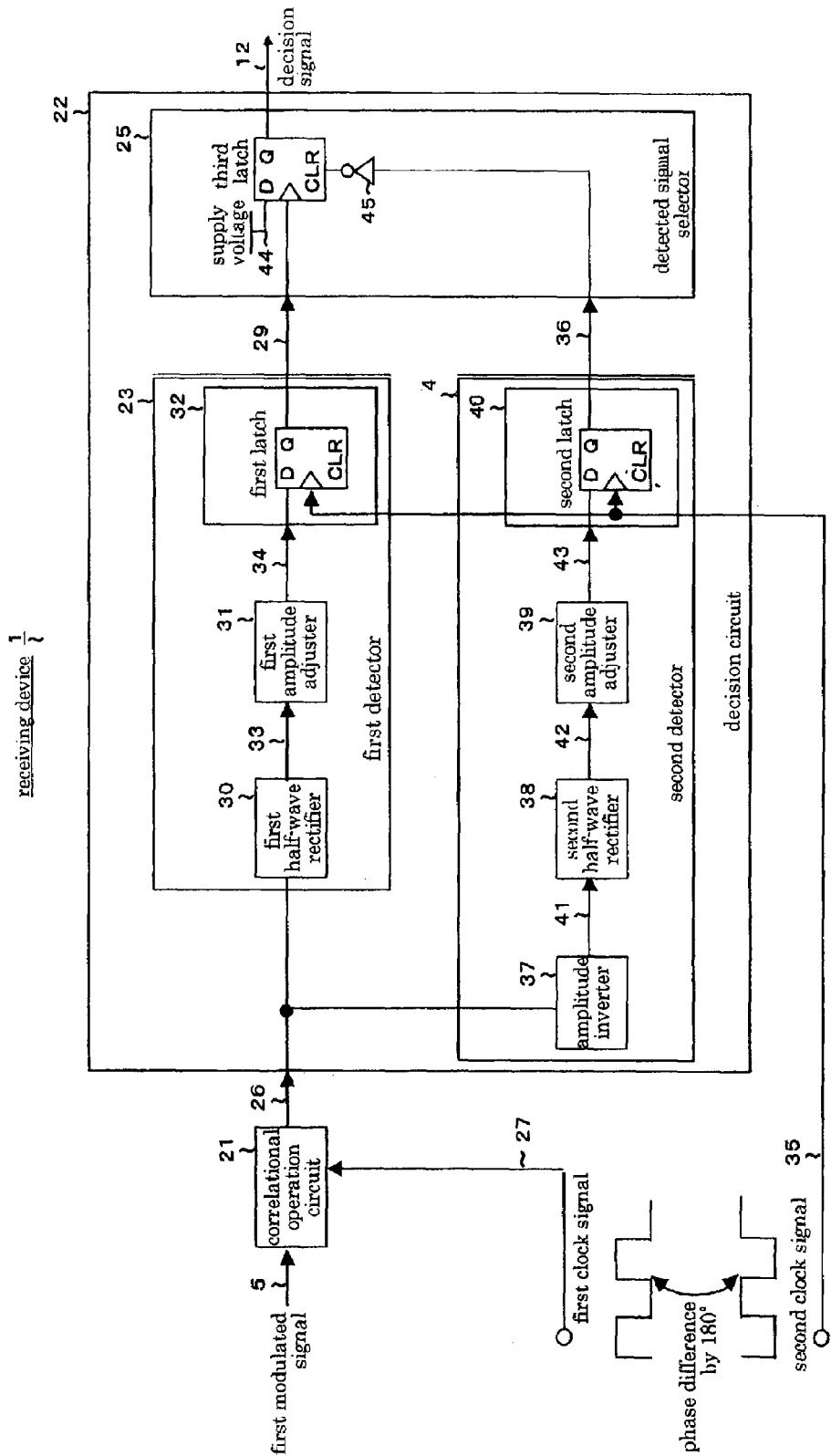
FIG. 2 is a block diagram illustrating the receiving construction of the first embodiment.

The block diagram illustrating the whole construction of the receiving device relating to the first embodiment is shown in FIG. 2. The receiving device 1 includes a correlational operation circuit 21 and a decision circuit 22, and the decision circuit 22 includes a first detector 23, a second detector 24, and a detected signal selector 25.

The correlational operation circuit 21 performs a correlational operation between the first modulated signal 5 having the spread-spectrum modulation applied and the first spread-spectrum signal string, and the correlational operation circuit 21 outputs a signal having the correlational operation applied as a first correlational signal 26.

The correlational operation circuit 21 is composed of a matched filter (MF) that uses, for example, a charge coupled device (CCD), SAW filter, and SAW convolver and so forth. When the correlational operation circuit 21 is made up with the matched filter, a first clock signal 27 is used for the operation of the inner shift register and the correlational operation. The code sequence of the first spread-spectrum signal string is formed of a code sequence of, for example, the PN code, Gold code, Walsh code, or the like.

The decision circuit 22 decides the amplitude of the first correlational signal 26 by means of the first detector 23, second detector 24, and detected signal selector 25; and the decision circuit 22 outputs a decided signal as the decision signal 12.

When the first detector 23 detects that the value of the first correlational signal 26 exceeds a first threshold value, the first detector 23 outputs a first detection signal 29. The first detector 23 includes, for example, a first half-wave rectifier 30, a first amplitude adjuster 31, and a first latch 32. The first half-wave rectifier 30 applies the half-wave rectification to the first correlational signal 26, and the first half-wave rectifier 30 outputs a half-wave rectified signal as a first half-wave rectified signal 33. The first amplitude adjuster 31 adjusts the amplitude of the first half-wave rectified signal 33, and first amplitude adjuster 31 outputs an adjusted signal as a first adjusted signal 34. The first latch 32 synchronizes with a second clock signal 35. The first latch 32 latches a first signal of the first value (High-level value), when the value of the first adjusted signal 34 inputted becomes equal to the first threshold value or more. The first latch 32 latches the first signal of the second value (Low-level value), when the value of the first adjusted signal 34 becomes less than the first threshold value. The first latch 32 outputs the latched first signal as the first detection signal 29. The first latch 32 is made up with a D flip-flop, for example.

When the second detector 24 detects that the value of the first correlational signal 26 exceeds a second threshold value, the second detector 24 outputs a second detection signal 36. The second detector 24 includes, for example, an amplitude inverter 37, a second half-wave rectifier 38, a second amplitude adjuster 39, and a second latch 40. The amplitude inverter 37 inverts the amplitude of the first correlational signal 26, and the amplitude inverter 37 outputs the inverted signal as a second correlational signal 41. The second half-wave rectifier 38 applies the half-wave rectification to the second correlational signal 41, and the second half-wave rectifier 38 outputs a half-wave rectified signal as a second half-wave rectified signal 42. The first amplitude adjuster 39 adjusts the amplitude of the second half-wave rectified signal 42, and second amplitude adjuster 39 outputs an adjusted signal as a second adjusted signal 43. The second latch 40 synchronizes with the second clock signal 35. The second latch 40 latches a second signal of the first value (High-level value), when the second adjusted signal 43 becomes equal to the first threshold value or more. The second latch 40 latches the second signal of the second value (Low-level value), when the second adjusted signal 43 becomes less than the first threshold value. The second latch 40 outputs the latched second signal as the second detection signal 36. The second latch 40 is made up with a D flip-flop, for example. Here, the first threshold value is a value having the sign of the second threshold inverted.

The detected signal selector 25 outputs the decision signal 12 of the first value (High-level value), when the first detection signal 29 is inputted; and the detected signal selector 25 outputs the decision signal 12 of the second value (Low-level value), when the second detection signal 36 is inputted. When the detected signal selector 25 inputs a third signal of the first value (High-level value) and the first detection signal 29 as a clock signal, the detected signal selector 25 latches a fourth signal of the first value (High-level value). When the detected signal selector 25 inputs the second detection signal 36 as a reset signal, the detected signal selector 25 latches the fourth signal of the second value (Low-level value). The detected signal selector 25 outputs the latched fourth signal as the decision signal 12. The detected signal selector 25 is made up with a D flip-flop, for example. When the detected signal selector 25 is made up with a D flip-flop, the detected signal selector 25 may take the supply voltage (Vcc) as the third signal 44. When the detected signal selector 25 is made up with a D flip-flop, and when the output signal becomes the second value (Low-level value) if the D flip-flop inputs the reset signal of the Low-level value at a clear terminal (CLR), the reset signal is inputted to the clear terminal (CLR) through an inverter 45.

(A-2) Operation of the First Embodiment

Figure 3:
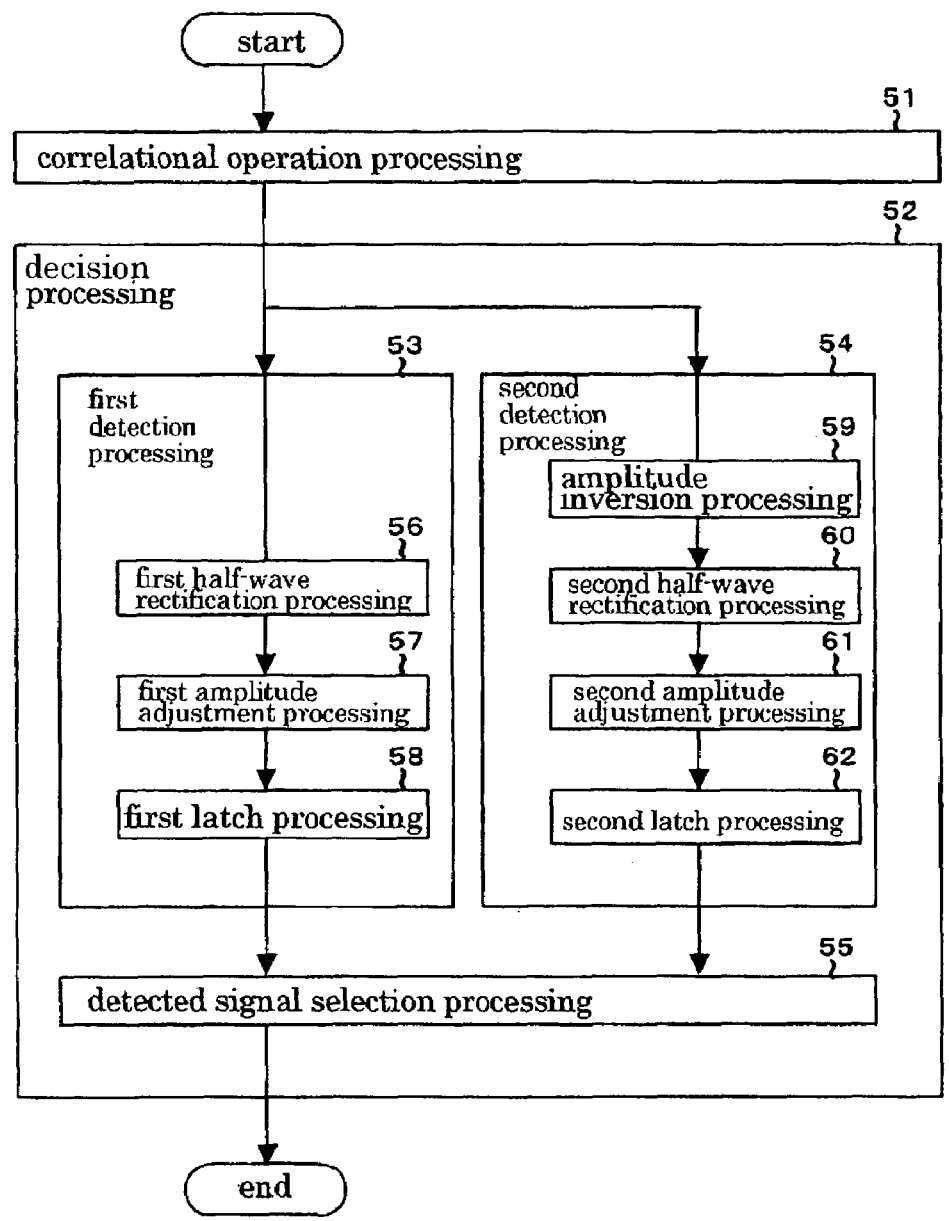
FIG. 3 is a flow chart illustrating the receiving processing of the first embodiment.
Figure 4:
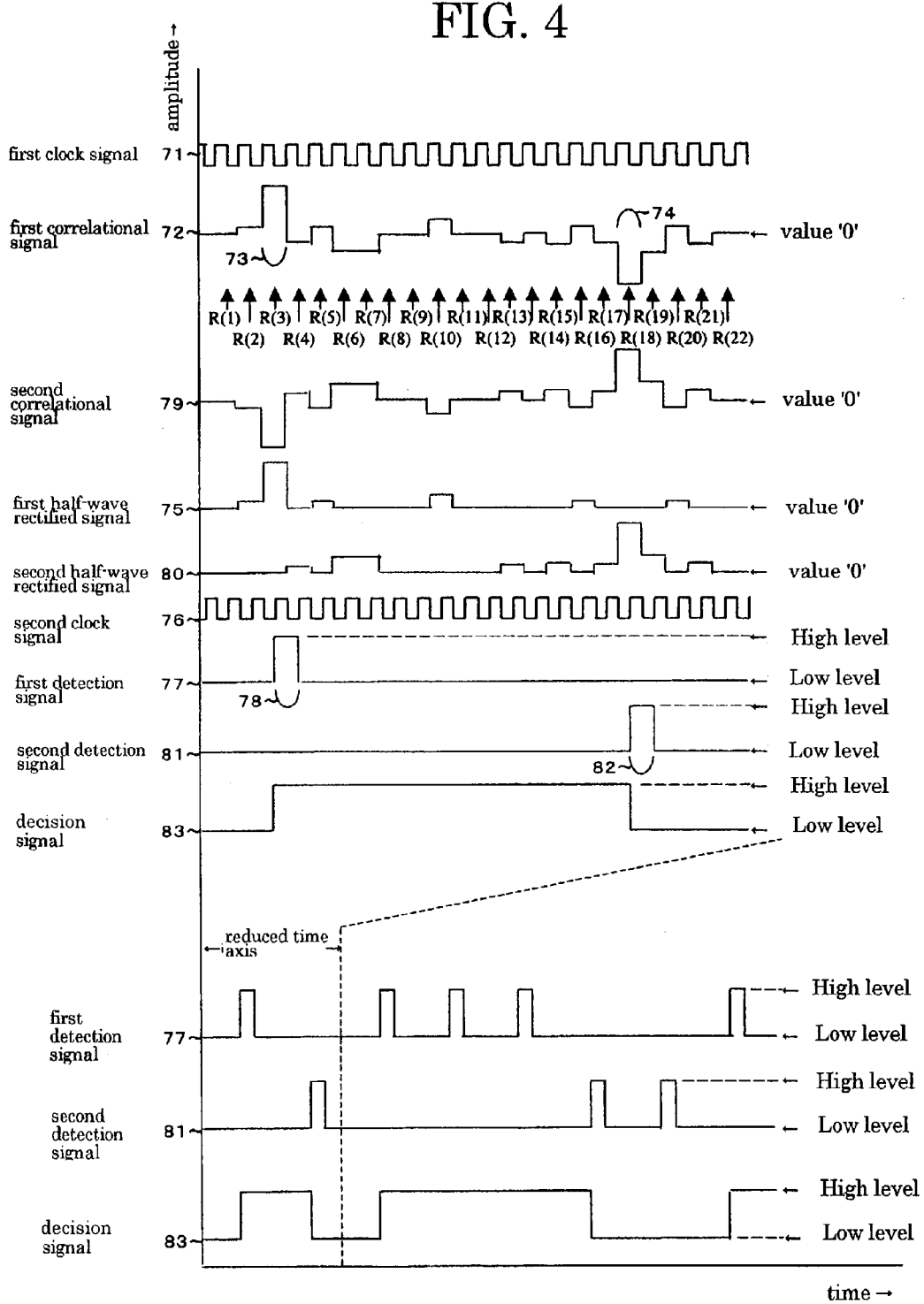
FIG. 4 is a chart illustrating the signal waveforms in each receiving circuit of the first embodiment.

Next, the reception operation of the invention will be described. FIG. 3 is a flow chart illustrating the whole operation of the receiving device of the first embodiment. The waveforms of input data and output data of each circuit in the receiving device of the first embodiment are shown in FIG. 4 as an example.

The total operation of the receiving device is composed of a correlational operation processing 51 and a decision processing 52, and the decision processing 52 is composed of a first detection processing 53, a second detection processing 54, and a detected signal selection processing 55. The first detection processing 53 is composed of, for example, a first half-wave rectification processing 56, a first amplitude adjustment processing 57, and a first latch processing 58. The second detection processing 54 is composed of, for example, an amplitude inversion processing 59, a second half-wave rectification processing 60, a second amplitude adjustment processing 61, and a second latch processing 62.

S1) Correlational Operation Processing

The correlational operation processing 51 (FIG. 3) employs the correlational operation circuit 21 in FIG. 2. The correlational operation processing 51 (FIG. 3) performs a correlational operation between the first modulated signal 5 having the spread-spectrum modulation applied and the first spread-spectrum signal string, and the correlational operation processing 51 outputs the first correlational signal 26. The inputted first modulated signal 5 contains the second modulated signal 8 (FIG. 1). The second modulated signal 8 is a signal having the spread-spectrum modulation applied, for example, with one pulse of the first transmission signal 6 (FIG. 1) and 15 code sequences of the second spread-spectrum signal string 7 (FIG. 1). The second modulated signal 8 is the signal having the spread-spectrum modulation applied, for example, with one pulse of the first transmission signal 6 and the code sequences for one cycle of the second spread-spectrum signal string 7 (here, the spread-spectrum signal for one cycle of the second spread-spectrum signal string 7 is assumed to contain 15 codes). The timing when to output the first correlational signal 26 to which the correlational operation is applied is controlled on the basis of the first clock signal 27. In the first embodiment, the timing is controlled on the basis of the rise of the first clock signal 27. The cycle of the first clock signal 27 is regarded as equal to the cycle in which one piece of the code sequence of the first spread-spectrum signal string is generated (here, the cycle of the first clock signal 27 may be faster by n-times (n: positive integer of 2 or more) than the cycle in which one piece of the code sequence of the first spread-spectrum signal string is generated).

The time series of the first modulated signal 5 that the correlational operation circuit 21 uses amounts to the number of codes contained in one cycle of the code sequence in the spread-spectrum modulation, and the time series of the first modulated signal 5 is assumed to be a time series: S $(1+(a-1)\times15)$~S $(a\times15)$: (a: integer of one or more) In the time series of the first spread-spectrum signal string, when one cycle of the code sequence in the spread-spectrum modulation is regarded as a time series C (1)~C (15), the time series of the first correlational signal 26 is given by a time series R (a).

A waveform 71 of the first clock signal 27 and a waveform 72 of the time series R (a) of the first correlational signal 26 are shown in FIG. 4. FIG. 4 illustrates the waveforms at the time series R (1)~R (22), as for the waveform 72 of the time series R (a). The time series R (1) is the correlational signal in which the correlational operation between the first modulated signal 5 (FIG. 2) [S (1)~S (15)] and the first spread-spectrum signal string [C (1)~C (15)] is executed. The time series R (2) is the correlational signal in which the correlational operation between the first modulated signal 5 [S (2)~S (16)] and the first spread-spectrum signal string [C (1)~C (15)] is executed. In a first timing 73 and a second timing 74 in the waveform 72 of the time series R (a), the cycle of the time series S of the first modulated signal 5 coincides with the cycle of the time series C of the first spread-spectrum signal string, which confirms that there is a correlation between the time series S of the first modulated signal 5 and the time series C of the first spread-spectrum signal string. The waveform at the first timing 73 is regarded as the waveform at the time series R (3), when the first transmission signal 6 of the first transmitter 3 (FIG. 1) is '1'. The waveform at the second timing 74 is regarded as the waveform at the time series R (18), when the first transmission signal 6 of the first transmitter 3 is '0'. In the waveform 72 of the time series R (a) of the first modulated signal 5 (FIG. 2), the waveforms showing a positive peak and a negative peak appear at the first timing 73 and the second timing 74 every 15-time series.

S2) Decision Processing

The decision processing 52 (FIG. 3) decides the amplitude of the first correlational signal 26 by means of the first detector 23, second detector 24, and detected signal selector 25; and the decision processing 52 outputs a decided signal as the decision signal 12. The decision processing 52 is divided into three, the first detection processing 53, second detection processing 54, detected signal selection processing 55.

S2a) First Detection Processing

The first detection processing 53 (FIG. 3) uses the first detector 23 in FIG. 2. When the first detection processing 53 detects that the value of the first correlational signal 26 exceeds the first threshold value, the first detection processing 53 outputs the first detection signal 29. The first detection processing 53 is divided into the first half-wave rectification processing 56, the first amplitude adjustment processing 57, and the first latch processing 58.

S2a-1) First Half-Wave Rectification Processing

The first half-wave rectification processing 56 (FIG. 3) uses the first half-wave rectifier 30. The first half-wave rectification processing 56 applies the half-wave rectification to the first correlational signal 26, and the first half-wave rectification processing 56 outputs the half-wave rectified signal as the first half-wave rectified signal 33. The first half-wave rectifier 30 passes the positive values in the amplitude of the first correlational signal 26 on the reference of a specified value (for example, '0'), and the first half-wave rectifier 30 changes the negative values into the specified value (for example, '0'). The waveform of the first half-wave rectified signal 33 becomes a waveform 75 (FIG. 4).

S2a-2) First Amplitude Adjustment Processing

The first amplitude adjustment processing 57 (FIG. 3) uses the first amplitude adjuster 31. The first amplitude adjustment processing 57 adjusts the amplitude of the first half-wave rectified signal 33, and the first amplitude adjustment processing 57 outputs the adjusted signal as the first adjusted signal 34. The first amplitude adjuster 31 amplifies (or attenuates) the amplitude of the first adjusted signal 34 to thereby adjust the level. The first amplitude adjuster 31 performs the level adjustment in such a manner that the positive peak value in the first adjusted signal 34 corresponding to the time series R (3) of the waveform 72 (FIG. 4) of the first correlational signal becomes equal to the first threshold value or more in the first latch 32 on the next stage.

S2a-3) First Latch Processing

The first latch processing 58 (FIG. 3) uses the first latch 32. The first latch processing 58 synchronizes with the second clock signal 35. The first latch processing 58 latches the first signal of the first value (High-level value), when the value of the first adjusted signal 34 inputted becomes equal to the first threshold value or more. The first latch processing 58 latches the first signal of the second value (Low-level value), when the value of the first adjusted signal 34 becomes less than the first threshold value. The first latch processing outputs the latched first signal as the first detection signal 29. When the first latch 32 is made up with a D flip-flop, for example, the first threshold level uses a judgment level for the threshold value of a logic circuit such as TTL or PECL. In regard to the second clock signal 35, the processing delay by the correlational operation circuit 21, the first half-wave rectifier 30, and the first amplitude adjuster 31 has to be considered, and the second clock signal 35 is formed of a clock signal with a specific delay. The second clock signal 35 is formed of a clock signal with a delay of half-cycle (180° by phase) against the first clock signal 27. The first latch 32 latches and decides the threshold value at the time that the second clock signal 35 rises. The first latch 32 outputs the latched first signal as the first detection signal 29. The waveform of the second clock signal 35 is shown by a waveform 76 (FIG. 4), and the waveform of the first detection signal 29 is shown by a waveform 77 (FIG. 4). When the waveform 72 of the first correlational signal 26 is at R (3), the waveform 77 of the first detection signal 29 synchronizes with the waveform 76 of the second clock signal 35, which delays by half-cycle (180° by phase) against the first clock signal 27 and becomes a signal of the High-level value (see the third timing 78 in FIG. 4).

S2b) Second Detection Processing

The second detection processing 54 (FIG. 3) uses the second detector 24. When the second detection processing 54 detects that the value of the first correlational signal 26 exceeds the second threshold value, the second detection processing 54 outputs the second detection signal 36. The second detection processing 54 is divided into four, the amplitude inversion processing 59 (FIG. 3), the second half-wave rectification processing 60, the second amplitude adjustment processing 61, and the second latch processing 62.

S2b-1) Amplitude Inversion Processing

The amplitude inversion processing 59 (FIG. 3) uses the amplitude inverter 37 in FIG. 2. The amplitude inversion processing 59 inverts the amplitude of the first correlational signal 26, and the amplitude inversion processing 59 outputs the inverted signal as the second correlational signal 41. The amplitude inverter 37 inverts the sign of the amplitude value of the first correlational signal 26, on the basis of a specified value (for example, '0'). The waveform of the second correlation signal 41 becomes a waveform 79 (FIG. 4). In this case, the sign '+' is inverted into the sign '−', and vice versa. S2b-2) Second Half-Wave Rectification Processing The second half-wave rectification processing 60 (FIG. 3) uses the second half-wave rectifier 38. The second half-wave rectification processing 60 applies the half-wave rectification to the second correlational signal 41, and the second half-wave rectification processing 60 outputs the half-wave rectified signal as the second half-wave rectified signal 42. The second half-wave rectifier 38 passes the positive values in the amplitude of the second correlational signal 41 on the reference of a specified value (for example, '0'), and the second half-wave rectifier 38 changes the negative values in the amplitude of the second correlational signal 41 into the specified value (for example, '0') The waveform of the second half-wave rectified signal 42 becomes a waveform 80 (FIG. 4).

S2b-3) Second Amplitude Adjustment Processing

The second amplitude adjustment processing 61 (FIG. 3) uses the second amplitude adjuster 39. The second amplitude adjustment processing 61 adjusts the amplitude of the second half-wave rectified signal 42, and the first amplitude adjustment processing 61 outputs the adjusted signal as the second adjusted signal 43. The second amplitude adjuster 39 amplifies (or attenuates) the amplitude of the second adjusted signal 43 to thereby adjust the level. The second amplitude adjuster 39 performs the level adjustment in such a manner that the positive peak value in the second adjusted signal 43 corresponding to the time series R (18) of the waveform 79 (FIG. 4) of the second correlational signal becomes equal to the first threshold value or more in the second latch processing on the next stage. (Here, the first threshold value is the value that the sign of the second threshold is inverted.)

S2b-4) Second Latch Processing

The second latch processing 62 (FIG. 3) uses the second latch 40. The second latch processing 62 synchronizes with the second clock signal 35. The second latch processing 62 latches the second signal of the first value (High-level value), when the value of the second adjusted signal 43 inputted becomes equal to the first threshold value or more. The second latch processing 62 latches the second signal of the second value (Low-level value), when the value of the second adjusted signal 43 becomes less than the first threshold value. The second latch processing outputs the latched second signal as the second detection signal 36. When the second latch 40 is made up with a D flip-flop, for example, the first threshold value uses a judgment level for the threshold value of a logic circuit such as TTL or PECL. In regard to the second clock signal 35, the processing delay by the correlational operation circuit 21, the amplitude inverter 37, the second half-wave rectifier 38, and the second amplitude adjuster 39 has to be considered, and the second clock signal 35 is formed of the clock signal with the specific delay. The second clock signal 35 is formed of the clock signal with the delay of half-cycle (180° by phase) against the first clock signal 27. The second latch 40 latches and decides the threshold value at the time that the second clock signal 35 rises. The second latch 40 outputs the latched second signal as the second detection signal 36. The waveform of the second detection signal 36 is shown by a waveform 81 (FIG. 4). When the waveform 72 of the first correlational signal 26 is at R (18), the waveform 81 of the first detection signal 36 synchronizes with the waveform 76 of the second clock signal 35, which delays by half-cycle (180° by phase) against the first clock signal 27 and becomes a signal of the High-level value (see the fourth timing 82 in FIG. 4).

S2c) Detected Signal Selection Processing

The detected signal selection processing 55 (FIG. 3) uses the detected signal selector 25 in FIG. 2. The detected signal selection processing 55 outputs the decision signal 28 of the first value (High-level value), when the first detection signal 29 is inputted. The detected signal selection processing 55 outputs the decision signal 28 of the second value (Low-level value), when the second detection signal 36 is inputted. When the detected signal selector 25 is made up with a D flip-flop, for example, the detected signal selector 25 inputs the third signal of the High-level value, and the first detection signal 29 is inputted as a clock signal. The detected signal selector 25 latches the fourth signal of the High-level value, when the first detection signal 29 rises from the Low-level value to the High-level value. The detected signal selector 25 latches the fourth signal of the Low-level value, when the second detection signal 36 rises from the Low-level value to the High-level value, and the second detection signal 36 is inputted as a reset signal. The detected signal selector 25 outputs the latched fourth signal as the decision signal 12. The waveform of the decision signal 12 is shown by the waveform 83 (FIG. 4).

The waveform 83 (FIG. 4) of the decision signal 12 becomes the High-level, when the first detection signal 29 of the High-level is inputted to the CLK terminal of the D flip-flop of the detected signal selector 25 (when the first transmission signal 6 (FIG. 1) is '1'). The waveform 83 of the decision signal 12 becomes the Low-level, when the second detection signal 36 of the Low-level is inputted to the CLR terminal of the D flip-flop of the detected signal selector 25 (when the first transmission signal 6 is '0'). The decision signal 12 becomes the reception signal having the first transmission signal 6 (FIG. 1) demodulated. The period during which one pulse of the decision signal 12 is generated is equal to the period during which one pulse of the first transmission signal 6 is generated. In this manner, the receiving device 1 receives and demodulates the first transmission signal 6, and outputs the decision signal 12.

(A-3) Effect of the First Embodiment

As described above, the first embodiment is designed to implement the decision of the threshold value of the signal level outputted from the correlator by means of the logic decision level of the logic circuit such as a TTL; accordingly, the first embodiment is not needed to use the A/D converter. As the result, the throughput of the receiving device is made lighter compared with the conventional one, and the scale of the receiving device is reduced compared with the conventional.

(B) Second Embodiment

The receiving device relating to the second embodiment of the invention will be described in detail with reference to the accompanying drawings.

(B-1) Construction of the Second Embodiment

Figure 5:
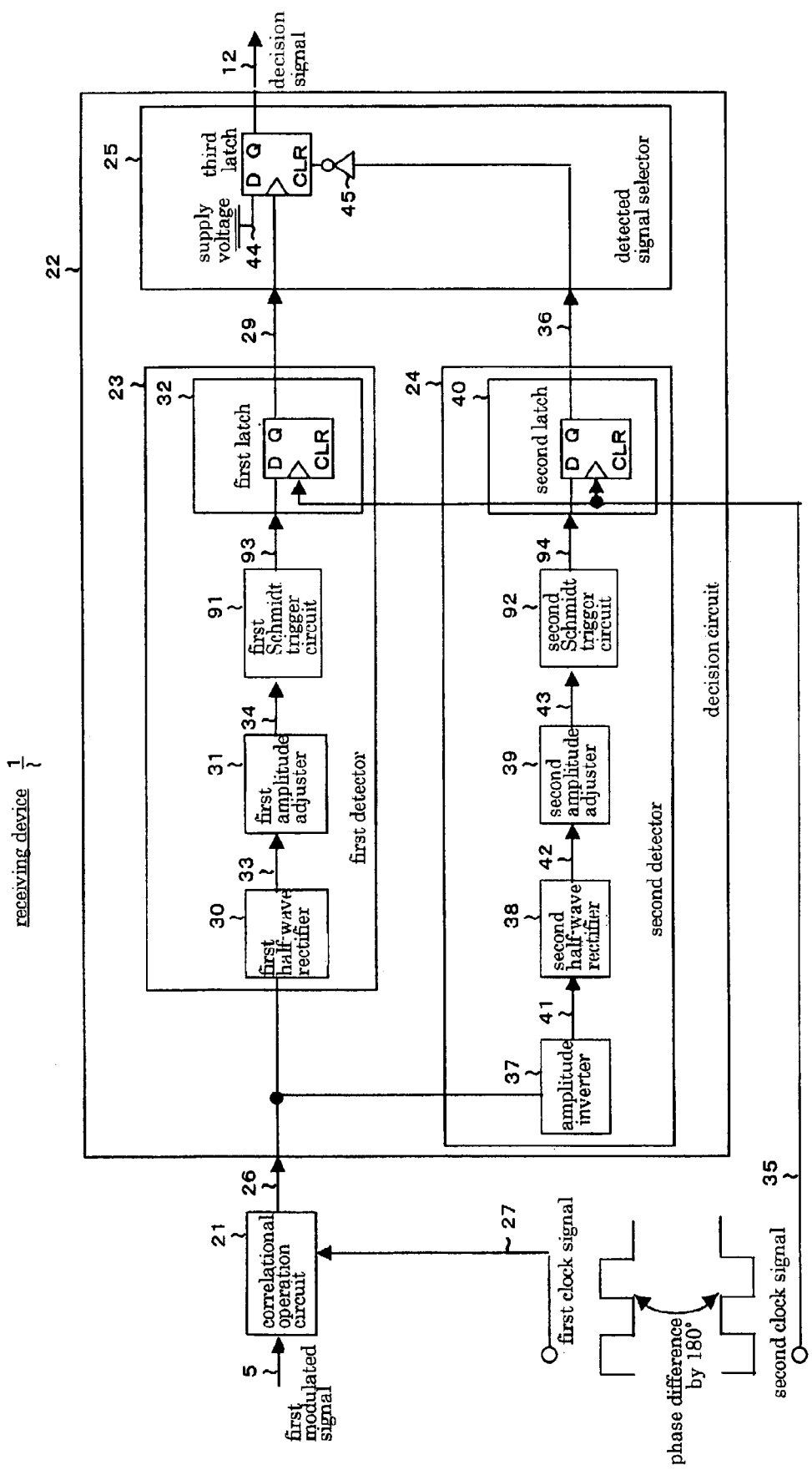
FIG. 5 is a block diagram illustrating the receiving construction of the second embodiment.

The schematic construction of a transmission/reception system including the receiving device relating to the second embodiment is illustrated in FIG. 1 in the same manner as in the first embodiment. The block diagram illustrating the whole construction of the receiving device relating to the second embodiment is shown in FIG. 5. The receiving device 1 includes the correlational operation circuit 21 and the decision circuit 22 in the same manner as the first embodiment, and the decision circuit 22 includes the first detector 23, the second detector 24, and the detected signal selector 25. However, the first detector 23 further includes a first Schmidt trigger circuit 91, and the second detector 24 further includes a second Schmidt trigger circuit 92. Hereunder, the whole construction of the receiving device 1 will be mentioned only for the different parts from the first embodiment.

When the first detector 23 detects that the value of the first correlational signal 26 exceeds the first threshold value, the first detector 23 outputs the first detection signal 29. In addition to the construction of the first embodiment (including the first half-wave rectifier 30, the first amplitude adjuster 31, and the first latch 32), the first detector 23 is provided with the first Schmidt trigger circuit 91 between the first amplitude adjuster 31 and the first latch 32. The first Schmidt trigger circuit 91 has a third threshold value and a fourth threshold value that is lower than the third threshold value. The first Schmidt trigger circuit 91 generates a fifth signal of the first value (High-level value) when the value of the first adjusted signal 34 becomes equal to or higher than the third threshold, and becomes equal to or higher than the fourth threshold. The first Schmidt trigger circuit 91 generates the fifth signal of the second value (Low-level value), when the value of the first adjusted signal 34 becomes lower than the fourth threshold, and becomes lower than the third threshold. The first Schmidt trigger circuit 91 outputs the generated fifth signal to the first latch 32 as a first Schmidt trigger signal 93. The first latch 32 inputs the first Schmidt trigger signal 93 instead of the first adjusted signal 34, and the first latch 32 outputs the first detection signal 29 in the same manner as the first embodiment. The first half-wave rectifier 30 and the first amplitude adjuster 31 are the same as the first embodiment.

When the second detector 24 detects that the value of the first correlational signal 26 exceeds the second threshold value, the second detector 24 outputs the second detection signal 36. In addition to the construction of the first embodiment (including the amplitude inverter 37, the second half-wave rectifier 38, the second amplitude adjuster 39, and the second latch 40), the second detector 24 is provided with the second Schmidt trigger circuit 92 between the second amplitude adjuster 39 and the second latch 40. The first Schmidt trigger circuit 92 has the third threshold value and the fourth threshold value that is lower than the third threshold value. The first Schmidt trigger circuit 92 generates a sixth signal of the first value (High-level value) when the value of the second adjusted signal 43 becomes equal to or higher than the third threshold, and becomes equal to or higher than the fourth threshold. The first Schmidt trigger circuit 92 generates the sixth signal of the second value (Low-level value), when the value of the second adjusted signal 43 becomes lower than the fourth threshold, and becomes lower than the third threshold. The first Schmidt trigger circuit 92 outputs the generated sixth signal to the second latch 40 as a second Schmidt trigger signal 94. The second latch 40 inputs the second Schmidt trigger signal 94 instead of the second adjusted signal 43, and the second latch 40 outputs the second detection signal 36 in the same manner as the first embodiment. The amplitude inverter 37, the second half-wave rectifier 38, and the second amplitude adjuster 39 are the same as the first embodiment.

(B-2) Operation of the Second Embodiment

Figure 6:
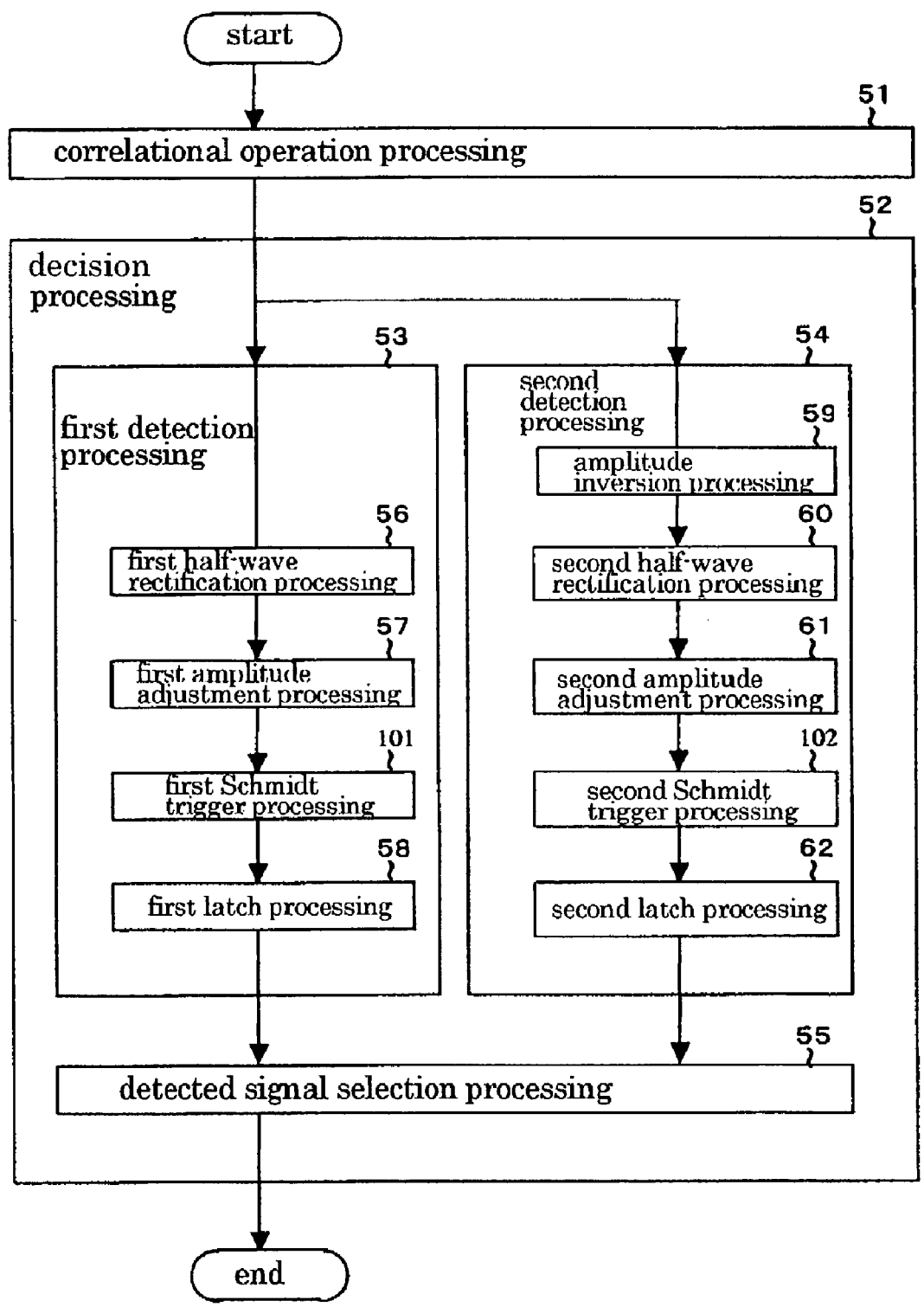
FIG. 6 is a flow chart illustrating the receiving processing of the second embodiment.
Figure 7:
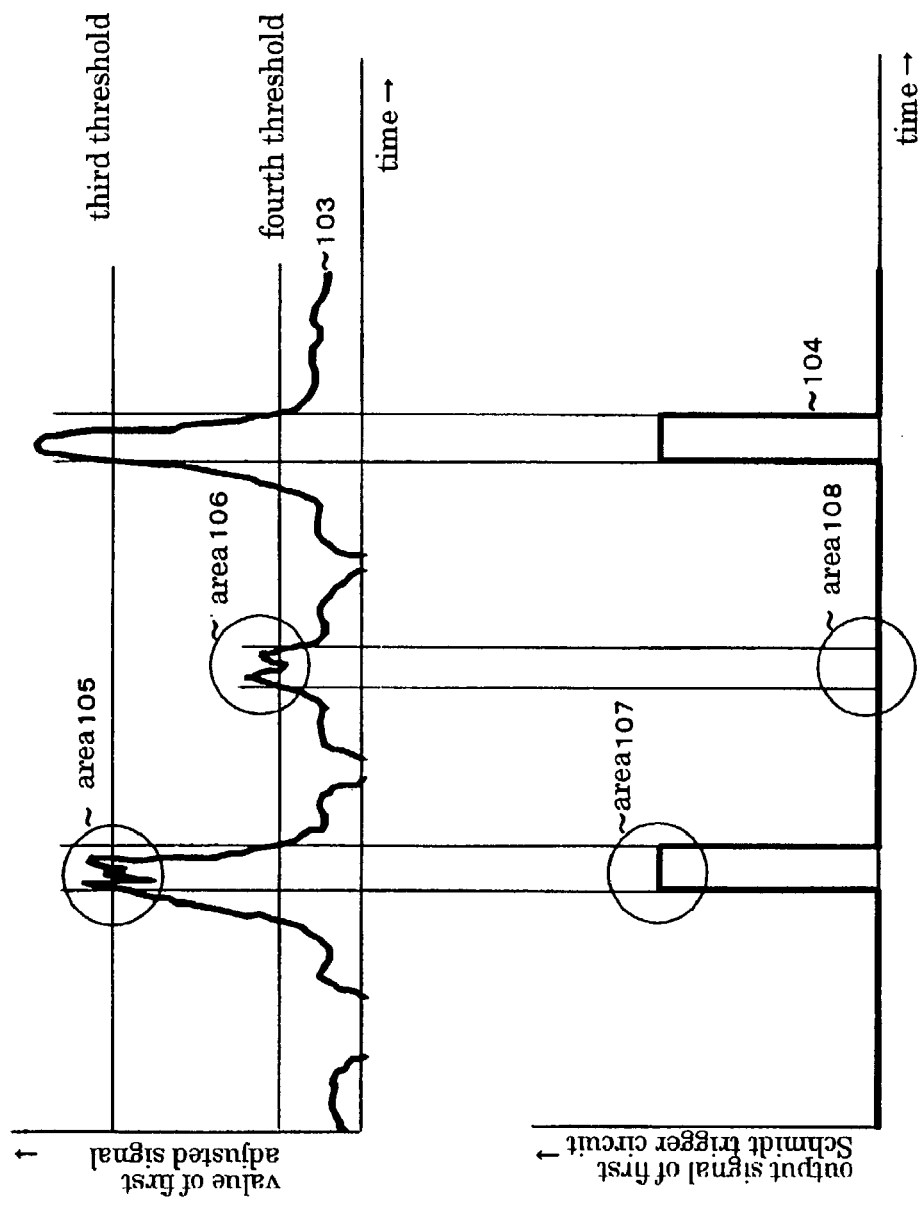
FIG. 7 is a chart illustrating the signal waveforms in the Schmidt trigger circuit of the second embodiment.

Next, the reception operation of the invention will be described. FIG. 6 is a flow chart illustrating the whole operation of the receiving device of the second embodiment. The waveforms of the data relating to the Schmidt trigger circuit 91 in the receiving device of the second embodiment are shown in FIG. 7 as an example.

The total operation of the receiving device illustrated in FIG. 6 is composed of the correlational operation processing 51 and the decision processing 52, and the decision processing 52 is composed of the first detection processing 53, the second detection processing 54, and the detected signal selection processing 55, which is the same as the first embodiment. However, the first detection processing 53 further includes a first Schmidt trigger processing 101, and the second detection processing 54 further includes a second Schmidt trigger processing 102. Hereunder, the whole operation of the receiving device 1 will be mentioned only for the different processing from the first embodiment.

S2a) First Detection Processing

The first detection processing 53 in FIG. 6 uses the first detector 23 (FIG. 5). When the first detection processing 53 (FIG. 6) detects that the value of the first correlational signal 26 (FIG. 5) exceeds the first threshold value, the first detection processing 53 in FIG. 6 outputs the first detection signal 29 (FIG. 5). In addition to the first half-wave rectification processing 56, the first amplitude adjustment processing 57, and the first latch processing 58, the first detection processing 53 further includes the first Schmidt trigger processing 101 between the first amplitude adjustment processing 57 and the first latch processing 58. However, the first latch processing 58 inputs the first Schmidt trigger signal 93 (FIG. 5) outputted from the first Schmidt trigger processing 101 instead of the first adjusted signal 34 (FIG. 5), and the first detection processing 53 in FIG. 6 outputs the first detection signal 29 (FIG. 5) in the same manner as the first embodiment.

S2a-4) First Schmidt Trigger Processing

The first Schmidt trigger processing 101 (FIG. 6) uses the first Schmidt trigger circuit 91 in FIG. 5. The first Schmidt trigger processing 101 (FIG. 6) generates the fifth signal of the first value (High-level value), when the value of the first adjusted signal 34 becomes equal to or higher than the third threshold, and becomes equal to or higher than the fourth threshold. The first Schmidt trigger processing 101 generates the fifth signal of the second value (Low-level value), when the value of the first adjusted signal 34 becomes lower than the fourth threshold, and becomes lower than the third threshold. The first Schmidt trigger processing 101 outputs the generated fifth signal to the first latch 32 as the first Schmidt trigger signal 93. In the first Schmidt trigger circuit 91, the third threshold value is selected as shown below. The third threshold value is selected among the values of the first correlational signal 26 which are attained when the first modulated signal 5 synchronizes with the first spread-spectrum signal string, and there exists correlation (positive correlation) between them. The third threshold value is the value whereby the influence of interferences by other stations is eliminated, the influence of noises is eliminated, and the existence of the correlation is recognized; and, of these values, the lowest one is selected for the third threshold value. And, the fourth threshold value is selected among the values of the first correlational signal 26 which are attained when there does not exist correlation between the first modulated signal 5 and the first spread-spectrum signal string. The fourth threshold value is selected among the values of the first correlational signal 26, and this value of the first correlational signal 26 is attained when there does not exist correlation between the first modulated signal 5 and the first spread-spectrum signal string. The fourth threshold value is the value whereby the influence of interferences (mutual correlations) by other stations is eliminated, and the influence of noises is eliminated; and, of these values, the highest one is selected for this fourth threshold value.

FIG. 7 illustrates a waveform 103 and a waveform 104. The waveform 103 is the waveform of the first adjusted signal 34 (FIG. 5) that is outputted from the first amplitude adjuster 31 (FIG. 5) and is inputted to the first Schmidt trigger circuit 91 (FIG. 5). The waveform 104 is the waveform of the first Schmidt trigger signal 93 (FIG. 5) outputted from the first Schmidt trigger circuit 91. The waveform 103 of the first adjusted signal 34 is formed of the waveform of the first correlational signal 26 (FIG. 5) having the positive value and the value '0'. The waveform in an area 105 of the waveform 103 of the first adjusted signal 34 (FIG. 5) is the one in a state that the first modulated signal 5 (FIG. 5) synchronizes with the first spread-spectrum signal string. Also, the waveform in this area 105 is the one that proves the existence of correlation between the first modulated signal 5 and the first spread-spectrum signal string. Further, the waveform in this area 105 is the one that has suffered the influence of interferences (mutual correlations) by other stations and the influence of noises. The waveform in an area 106 of the waveform 103 of the first adjusted signal 34 (FIG. 5) is the one that does not prove the existence of correlation between the first modulated signal 5 and the first spread-spectrum signal string. Further, the waveform in this area 106 is the one that has suffered the influence of interferences (mutual correlations) by other stations and the influence of noises.

In the area 105, the waveform 103 of the first adjusted signal 34 (FIG. 5) rises and falls from the third threshold value. The first Schmidt trigger circuit 91 (FIG. 5) generates the first Schmidt trigger signal 93 of the High-level value. Therefore, the waveform 104 of the first Schmidt trigger signal 93 becomes a signal waveform of the High-level value, as shown by a waveform in an area 107. And, in the area 106, the waveform 103 of the first adjusted signal 34 (FIG. 5) rises and falls from the fourth threshold value. The first Schmidt trigger circuit 91 generates the first Schmidt trigger signal 93 of the Low-level value. Therefore, the waveform 104 of the first Schmidt trigger signal 93 becomes a signal waveform of the Low-level value, as shown by a waveform in an area 108.

S2b) Second Detection Processing

The second detection processing 54 in FIG. 6 uses the second detector 24 (FIG. 5). When the second detection processing 54 (FIG. 6) detects that the value of the first correlational signal 26 (FIG. 5) exceeds the second threshold value, the second detection processing 54 in FIG. 6 outputs the second detection signal 36 (FIG. 5). In addition to the amplitude inversion processing 59, the second half-wave rectification processing 60, the second amplitude adjustment processing 61, and the second latch processing 62, the second detection processing 54 further includes the second Schmidt trigger processing 102 between the second amplitude adjustment processing 61 and the second latch processing 62. However, the second latch processing 62 inputs the second Schmidt trigger signal 94 (FIG. 5) outputted from the second Schmidt trigger processing 102 instead of the second adjusted signal 43 (FIG. 5). The second latch processing 62 in FIG. 6 outputs the second detection signal 36 (FIG. 5) in the same manner as the first embodiment.

S2b-4) Second Schmidt Trigger Processing

The second Schmidt trigger processing 102 (FIG. 6) performs the same processing as the first Schmidt trigger processing 101 (FIG. 6). The second Schmidt trigger processing 102 uses the second Schmidt trigger circuit 92 in FIG. 5. The second Schmidt trigger processing 102 (FIG. 6) generates the sixth signal of the first value (High-level value), when the value of the second adjusted signal 43 becomes equal to or higher than the third threshold, and becomes equal to or higher than the fourth threshold. The second Schmidt trigger processing 102 generates the sixth signal of the second value (Low-level value), when the value of the second adjusted signal 43 becomes lower than the fourth threshold, and becomes lower than the third threshold. The second Schmidt trigger processing 102 outputs the generated sixth signal to the second latch 40 as the second Schmidt trigger signal 94.

Also in the second Schmidt trigger circuit 92, the third threshold value is selected among the values of the first correlational signal 26 which are attained when the first modulated signal 5 synchronizes with the first spread-spectrum signal string, and there exists correlation (negative correlation) between them. The third threshold value is selected among the values whereby the influence of interferences by other stations and the influence of noises are eliminated, and the existence of the correlation is recognized; and, of these values, the lowest one is selected for the third threshold value. And, the fourth threshold value is selected among the values of the first correlational signal 26 which are attained when there does not exist correlation between the first modulated signal 5 and the first spread-spectrum signal string. For the fourth threshold value, the highest one is selected in consideration of the influence of interferences (mutual correlations) by other stations and the influence of noises.

The detailed operations are the same as those in the first Schmidt trigger processing 101 except for the following different point, and the explanation of them will be omitted. The difference lies in that the waveform of the second adjusted signal 43 being outputted from the second amplitude adjuster 39 and inputted to the second Schmidt trigger circuit 92 is the waveform obtained by inverting the sign of the first correlational signal 26, with regard to the negative value of the first correlational signal 26.

(B-3) Effect of the Second Embodiment

In the second embodiment, the first Schmidt trigger circuit 91 is placed on the pre-stage of the first latch, and the second Schmidt trigger circuit 92 is placed on the prestage of the second latch; and thereby, the second embodiment is able to prevent chattering by the influence of interferences by other stations and the influence of noises, in the correlational signal outputted from the correlator. The second embodiment makes it possible to precisely extract the synchronizing position of the modulated signal and the spread-spectrum signal string.

(C) Third Embodiment

The receiving device relating to the third embodiment of the invention will be described in detail with reference to the accompanying drawings.

(C-1) Construction of the Third Embodiment

Figure 8:
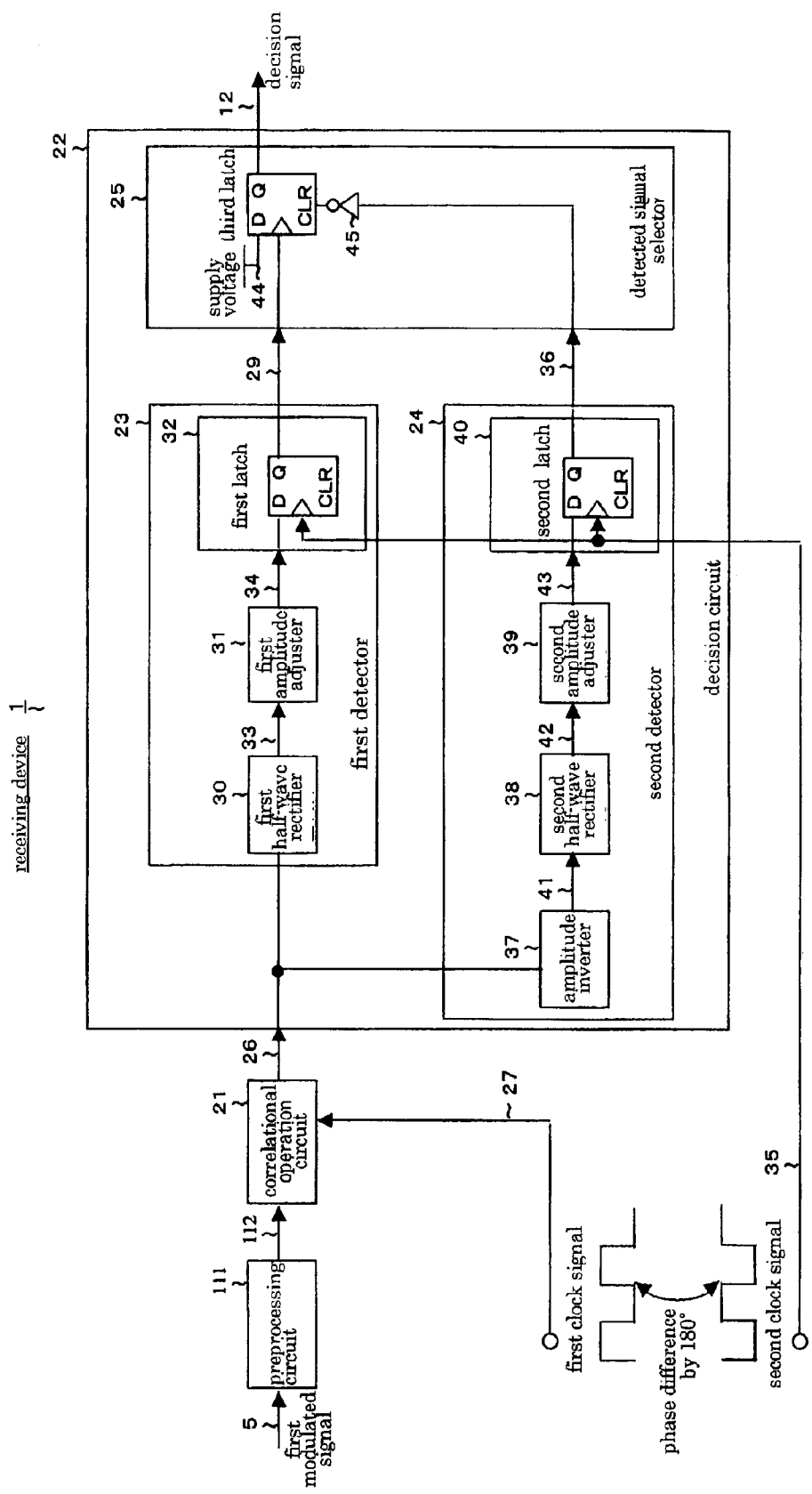
FIG. 8 is a block diagram illustrating the receiving construction of the third embodiment.

The schematic construction of a transmission/reception system including the receiving device relating to the third embodiment is the same as that of the first embodiment, which is illustrated in FIG. 1. The block diagram illustrating the whole construction of the receiving device relating to the third embodiment is shown in FIG. 8. The whole construction of this receiving device 1 further includes a preprocessing circuit 111 on the pre-stage of the correlational operation circuit 21, in addition to the construction of the first embodiment (correlational operation circuit 21, decision circuit 22). And, the correlational operation circuit 21 is formed of a delay unit 113 (FIG. 9) that stores and delays a preprocessed first modulated signal, namely, a preprocessed signal 112 by the number of signals contained in one cycle of the first spread-spectrum signal string, and an arithmetic operation unit 114 (FIG. 9) that multiplies each preprocessed signal (delayed signal) of the preprocessed signal 112 being stored and delayed by each spread-spectrum signal contained in one cycle of the first spread-spectrum signal string, and adds each multiplied signal obtained by the above multiplication. The total construction of the receiving device will be described only for the construction different from the first embodiment.

The preprocessing circuit 111 preprocesses the first modulated signal 5 in such a manner that the maximum power of the input signal in the correlational operation circuit 21 becomes a specified value. The preprocessing circuit 111 outputs the preprocessed first modulated signal to the correlational operation circuit 21 as the preprocessed signal 112.

Figure 9:
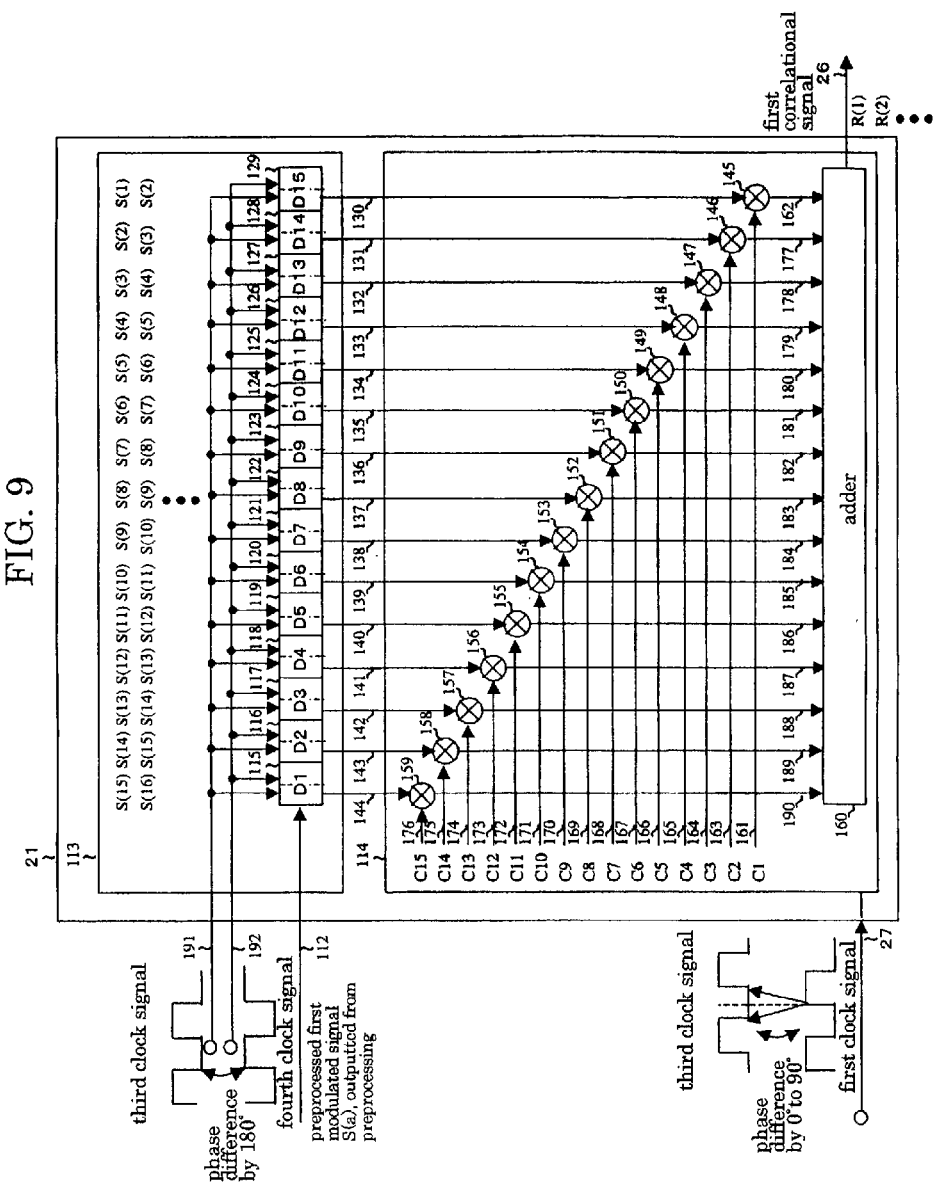
FIG. 9 is a block diagram illustrating the correlational operation circuit of the third embodiment.

The correlational operation circuit 21 is composed of the delay unit 113 and the arithmetic operation unit 114, as shown in FIG. 9. The delay unit 113 stores and delays the preprocessed first modulated signal 5, namely, the preprocessed signal 112 by the number of signals (15, in this case) contained in one cycle of the first spread-spectrum signal string. The delay unit 113 is formed of plural shift registers: a first shift register [D1] 115, . . . , and a 15-th shift register [D15] 129, which is made up with a charge coupled device (CCD), for example. The delay unit 113 stores and delays the preprocessed signal 112, and outputs a first delayed signal [S (1+(a−1)×15)] 130, . . . , and a 15-th delayed signal [S (a×15)] 144. The delayed signal [S (1+(a−1)×15)] 130 is a signal with the longest delay time of the stored and delayed preprocessed signal 112, and the delayed signal [S (a×15)] 144 is a signal with the shortest delay time. The arithmetic operation unit 114 multiplies each signals of the preprocessed signal 112 being stored and delayed: the first delayed signal S (1+(a−1)×15), . . . , and the 15-th delayed signal S (a×15) by each signals for the number of signals (15, in this case) contained in one cycle of the first spread-spectrum signal string: the first spread-spectrum signal C (1), . . . , and a 15-th spread-spectrum signal C (15). Further, the arithmetic operation unit 114 adds each multiplied signals for the number of signals (15, in this case) contained in one cycle: a first multiplied signal S (1+(a−1)×15)×C (1), . . . , and a 15-th multiplied signal S (a×15)×C (1). The arithmetic operation unit 114 is composed of a first multiplier 145, . . . , and a 15-th multiplier 159, and an adder 160. The first multiplier 145 multiplies the first delayed signal [S (1+(a−1)×15)] 130 by the first spread-spectrum signal [C (1)] 161, and outputs the first multiplied signal [S (1+(a−1)×15)×C (1)] 162. In the same manner, each multipliers: the second multiplier 146 through the 15-th multiplier 159 multiplies each delayed signals: the second delayed signal [S (2+(a−1)×15)] 131, . . . , and the 15-th delayed signal [S (a×15)] 144 by each spread-spectrum signals: the second spread-spectrum signal [C (2)] 163, . . . , and the 15-th spread-spectrum signal [C (15)] 176, and outputs each multiplied signals: the second multiplied signal [S (2+(a−1)×15)×C (2)] 177 through the 15-th multiplied signal [S (a×15)×C (15)] 190. The adder 160 adds the first multiplied signal 162, the second multiplied signal 177, . . . , and the 15-th multiplied signal 190, and outputs the added signal. The added signal becomes the first correlational signal 26

(C-2) Operation of the Third Embodiment

Figure 10:
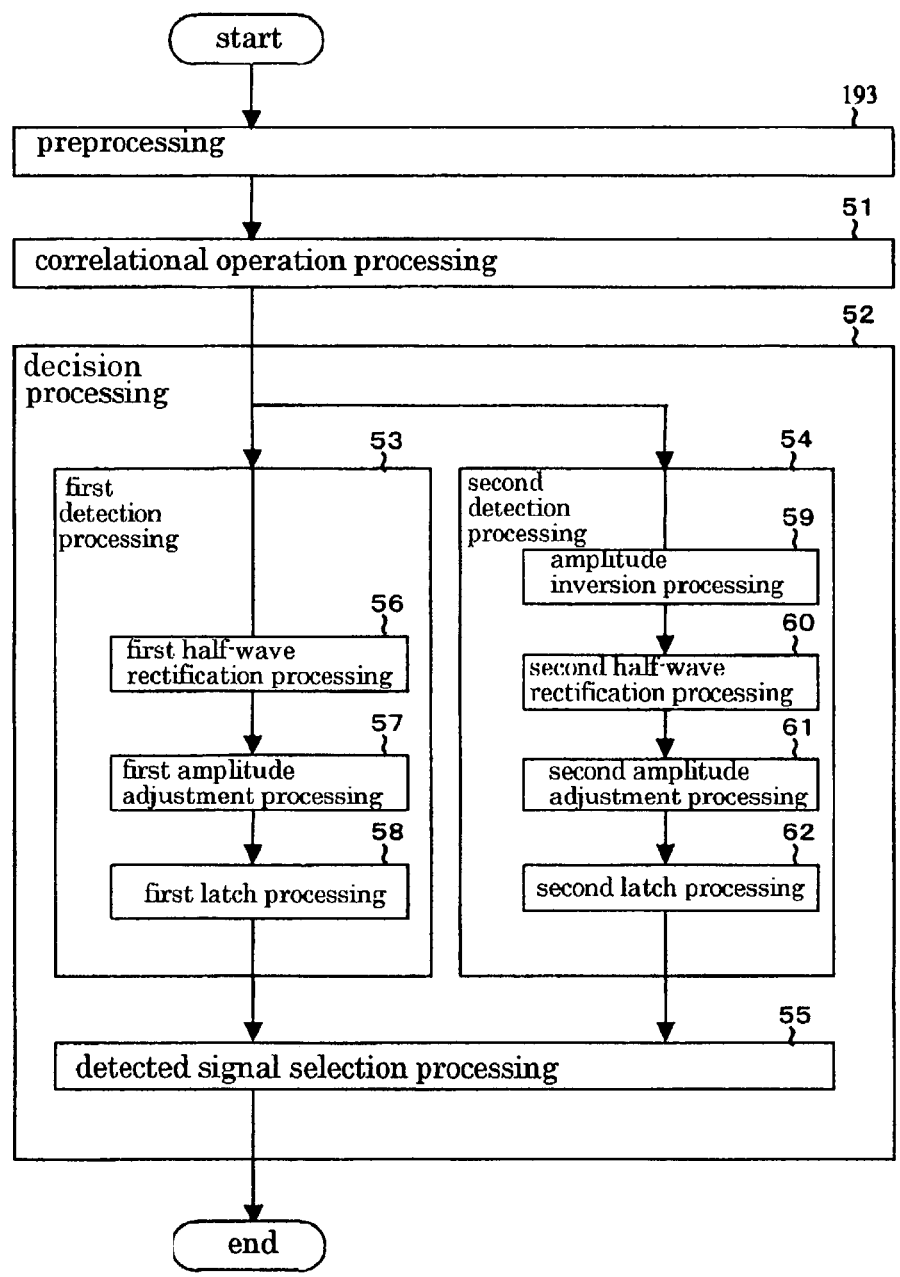
FIG. 10 is a flow chart illustrating the receiving processing of the third embodiment.

Next, the reception operation of the invention will be described. FIG. 10 is a flow chart illustrating the whole operation of the receiving device of the third embodiment.

The total operation of the receiving device is composed of the correlational operation processing 51 and the decision processing 52 in the same manner as the first embodiment, and a preprocessing 193 is additionally provided.

The correlational operation processing 51 uses the delay unit 113 (FIG. 9) formed of a CCD. The correlational operation processing 51 inputs the preprocessed signal 112 (FIG. 8) outputted from the preprocessing 193 instead of the first modulated signal 5 (FIG. 8), and outputs the first correlational signal 26 (FIG. 8), in the same manner as the first embodiment. The decision processing 52 is composed of the first detection processing 53, the second detection processing 54, and the detected signal selection processing 55, which is the same as the first embodiment. Hereunder, the whole operation of the receiving device 1 will be mentioned only for the different processing from the first embodiment.

S4) Preprocessing

The preprocessing 193 (FIG. 10) uses the preprocessing circuit 111 in FIG. 8. The preprocessing 193 (FIG. 10) preprocesses the first modulated signal 5 in such a manner that the maximum power of the input signal in the correlational operation circuit 21 becomes a specified value. The preprocessing 193 (FIG. 10) outputs the preprocessed first modulated signal 5 to the correlational operation circuit 21 as the preprocessed signal 112. The preprocessing circuit 111 measures the maximum power of the first modulated signal 5 at each specified time. The preprocessing circuit 111 amplifies (attenuates, or slices by a specific value) the first modulated signal 5 on the basis of the measured value, in such a manner that the maximum power of the input signal in the correlational operation circuit 21 becomes the specified value. The preprocessing circuit 111 outputs the preprocessed signal 112, so that the maximum power of the first modulated signal 5 becomes the maximum power permissible to the delay unit 113 of the correlational operation circuit 21.

Further, the preprocessing circuit 111 estimates the maximum power of the first modulated signal 5 from the number of transmitters connected in the transmitting device 2. The preprocessing circuit 111 amplifies (or attenuates) the first modulated signal 5 on the basis of the estimated value, in such a manner that the maximum power of the input signal in the correlational operation circuit 21 becomes the specified value. And, the preprocessing circuit 111 outputs the preprocessed signal 112, so that the maximum power of the first modulated signal 5 becomes the maximum power permissible to the delay unit 113 of the correlational operation circuit 21. It is assumed that, in the preprocessing circuit 111, the number of transmitters connected in the transmitting device 2 is N, and the value of the preprocessed signal 112 is equal to the maximum input value permissible to the delay unit 113 of the correlational operation circuit 21. On this assumption, when one transmitter is connected in the transmitting device 2, the preprocessing circuit 111 outputs the preprocessed signal 112 having the first modulated signal 5 multiplied by N to the delay unit 113 of the correlational operation circuit 21. And, it is assumed that, in the preprocessing circuit 111, the number of transmitters connected in the transmitting device 2 is 1, and the value of the preprocessed signal 112 is equal to the maximum input value permissible to the delay unit 113 of the correlational operation circuit 21. On this assumption, when N-pieces of transmitters are connected in the transmitting device 2, the preprocessing circuit 111 outputs the preprocessed signal 112 having the first modulated signal 5 multiplied by 1/N to the delay unit 113 of the correlational operation circuit 21.

S1) Correlational Operation Processing

The correlational operation processing 51 (FIG. 10) uses the correlational operation circuit 21 in FIG. 8. The correlational operation processing 51 executes the correlational operation between the preprocessed first modulated signal 5, namely, the preprocessed signal 112 and the first spread-spectrum signal string, and the correlational operation processing outputs the first correlational signal 26. In FIG. 9, the correlational operation circuit 21 is composed of the delay unit 113 and the arithmetic operation unit 114. The delay unit 113 is formed of plural shift registers :the first shift register [D1] 115, . . . , and the 15-th shift register [D15] 129 (here, the number of signals contained in one cycle of the first spread-spectrum signal string is regarded as 15). The delay unit 113 stores and delays the preprocessed signal 112 by the number of signals contained in one cycle of the first spread-spectrum signal string. The arithmetic operation unit 114 is composed of the first multiplier 145, . . . , and the 15-th multiplier 159, and the adder 160. Each multipliers (the first multiplier 145, . . . , and the 15-th multiplier 159) of the arithmetic operation unit 114 multiply each delayed signals of the preprocessed signal 112 being stored and delayed: the first delayed signal [S (1+(a−1)×15)] 130, . . . , and the 15-th delayed signal [S (a×15)] 144 by each spread-spectrum signals for the number of signals (15, in this case) contained in one cycle of the first spread-spectrum signal string: the first spread-spectrum signal [C (1)] 161, the second spread-spectrum signal [C (2)] 163, . . . , and the 15-th spread-spectrum signal [C (15)] 176. The adder 160 adds each the multiplied signals (15 signals) in one cycle: the first multiplied signal [S (1+(a−1)×15)×C (1)] 162, the second multiplied signal [S (2+(a−1)×15)×C (2)] 177, . . . , and the 15-th multiplied signal [S (a×15)×C (15)] 190.

In the plural shift registers of the delay unit 113: the first shift register [D1] 115 through the 15-th shift register [D15] 129, the preprocessed signal 112 is inputted to the first shift register [D1] 115. In the plural shift registers of the delay unit 113, the preprocessed signal 112 is stored and delayed by the second shift register [D2] 116, the third shift register [D3] 117, . . . , and the 15-th shift register [D15] 129, from the left to the right of the shift register (from a shorter delay time to a longer delay time) for the number of signals (15 pieces) in one cycle of the first spread-spectrum signal string. To store and delay the preprocessed signal 112 in the delay unit 113, there has to be prepared a third clock signal 191 and a fourth clock signal 192. And, the phase difference between the third clock signal 191 and the fourth clock signal 192 should be 180°. The third clock signal 191 is inputted to the left areas to the centers of each shift registers, which are located on the input side of the preprocessed signal 112. The third clock signal 191 is inputted to the first shift register [D1] 115, . . . , and the 15-th shift register [D15] 129. The fourth clock signal 192 is inputted to the right areas to the centers of each shift registers, which are located on the output side of the preprocessed signal 112. The fourth clock signal 192 is inputted to the first shift register [D1] 115, . . . , and the 15-th shift register [D15] 129. The preprocessed signal 112 uses the third clock signal 191 and the fourth clock signal 192. The preprocessed signal 112 raises the charge potentials in the left areas: the areas on the input side (or the right areas: the areas on the output side) of the first shift register [D1] 115, . . . , and the 15-th shift register [D15] 129; and the preprocessed signal 112 lowers the charge potentials in the right areas: the areas on the output side (or the left areas: the areas on the input side) of the first shift register [D1] 115, . . . , and the 15-th shift register [D15] 129. Thus, the preprocessed signal 112 is stored and delayed.

The arithmetic operation unit 114 of the correlational operation circuit 21 multiplies each delayed signals of the preprocessed signal 112 being stored and delayed: the first delayed signal [S (1+(a−1)×15)] 130 through the 15-th delayed signal [S (a×15)] 144 by each spread-spectrum signals of the first spread-spectrum signal string: the first spread-spectrum signal [C (1)] 161, the second spread-spectrum signal [C (2)] 163, . . . , and the 15-th spread-spectrum signal [C (15)] 176. The arithmetic operation unit 114 of the correlational operation circuit 21 outputs the added signal, namely, a first correlational signal R (a) as the first correlational signal 26. The arithmetic operation unit 114 of the correlational operation circuit 21 adds each multiplied signals: the first multiplied signal [S (1+(a−1)×15)×C (1)] 162, the second multiplied signal [S (2+(a−1)×15)×C (2)] 177, . . . , and the 15-th multiplied signal [S (a×15)×C (15)] 190. The arithmetic operation unit 114 of the correlational operation circuit 21 outputs the added signal: the first correlational signal R (a) as the first correlational signal 26. When the first clock signal 27 is inputted to the arithmetic operation unit 114 of the correlational operation circuit 21, the first correlational signal [R (1)] 26 is made up with the signals obtained by the multiplication of each delayed signals: the first delayed signal [S (1)] 130, . . . , the 15-th delayed signal [S (15)] 144, and each spread-spectrum signals of the first spread-spectrum signal string: the first spread-spectrum signal [C (1)] 161, the second spread-spectrum signal [C (2)] 163, . . . , the 15-th spread-spectrum signal [C (15)] 176, and the addition of the multiplied signals: [S (1)×C (1)+S (2)×C (2)+ . . . +S (15)×C (15)]. When the first clock signal 27 is again inputted to the arithmetic operation unit 114 of the correlational operation circuit 21, the first correlational signal [R (2)] 26 is made up with the signals obtained by the multiplication of each delayed signals: the first delayed signal [S (2)] 130, . . . , the 15-th delayed signal [S (16)] 144, and each spread-spectrum signals of the first spread-spectrum signal string: the first spread-spectrum signal [C (1)] 161, the second spread-spectrum signal [C (2)] 163, . . . , the 15-th spread-spectrum signal [C (15)] 176, and the addition of the multiplied signals: [S (2)×C 1+S (3)×C 2+ . . . +S (16) ×C 15].

In other words, the arithmetic operation unit 114 multiplies each delayed signals of the preprocessed signal 112 being stored and delayed by the number of signals contained in one cycle of the first spread-spectrum signal string: the first delayed signal [S (1+(a−1)×15)] 130, . . . , the 15-th delayed signal [S (a×15)] 144 by each spread-spectrum signals for the number of signals in one cycle: the first spread-spectrum signal [C (1)] 161, the second spread-spectrum signal [C (2)] 163, the 15-th spread-spectrum signal [C (15)] 176. The signal having the first delayed signal [S (1+(a−1)×15)] 130 multiplied by the first spread-spectrum signal [C (1)] 161 is specified as the first multiplied signal 162, . . . , and the signal having the 15-th delayed signal [S (a×15)] 144 multiplied by the 15-th spread-spectrum signal [C (15)] 176 is specified as the 15-th multiplied signal 190. Further, the first multiplied signal 162, the second multiplied signal 177, . . . , and the 15-th multiplied signal 190 are added, and the added signal is outputted as the first correlational signal 26 from the correlational operation circuit 21. As an example, the code sequence of the first spread-spectrum signal string made up with 15 signals was defined: the first spread-spectrum signal [C (1)] 161, the second spread-spectrum signal [C (2)] 163, . . . , the 15-th spread-spectrum signal [C (15)] 176. The code sequence of the first spread-spectrum signal string made up with N-pieces of signals is obtained by multiplying each delayed signals: the first delayed signal, . . . , and the N-th delayed signal by each spread-spectrum signals: the first spread-spectrum signal, and the N-th spread-spectrum signal, and adding the multiplied results. And, in regard to the relation of phase between the first clock signal 27 and the third clock signal 191, the third clock signal 191 has a phase delay of 0 ~ 90° against the phase of the first clock signal 27. Preferably, the third clock signal 191 has a phase delay of 45° against the phase of the first clock signal 27. And, in regard to the relation of phase between the first clock signal 27 and the fourth clock signal 192, the fourth clock signal 192 has a phase delay of 180 ~ 270° against the phase of the first clock signal 27. Preferably, the fourth clock signal 192 has a phase delay of 225° against the phase of the first clock signal 27.

In the third embodiment, FIG. 9 shows the first clock signal 27, the third clock signal 191, and the fourth clock signal 192 separately. In the third embodiment, the following phase delay unit (not illustrated) may be provided. The phase delay unit (not illustrated) takes in the first clock signal 27 as an input signal, and delays the phase of the input signal by 0 ~ 90° (preferably, 45°) against the phase of the first clock signal 27, and outputs the third clock signal 191. Further, the phase delay unit (not illustrated) takes in the first clock signal 27, and delays the phase of the input signal by 180~ 270° (preferably, 225°) against the phase of the first clock signal 27, and outputs the fourth clock signal 192.

(C-3) Effect of the Third Embodiment

Applying a CCD to the correlational operation circuit, the third embodiment makes it possible to process the correlational operation at a high speed. The third embodiment makes it possible to receive the modulated signal, even if the data transfer rate of the modulated signal is very high.

(D) Fourth Embodiment

The receiving device relating to the fourth embodiment of the invention will be described in detail with reference to the accompanying drawings.

(D-1) Construction of the Fourth Embodiment

Figure 11:
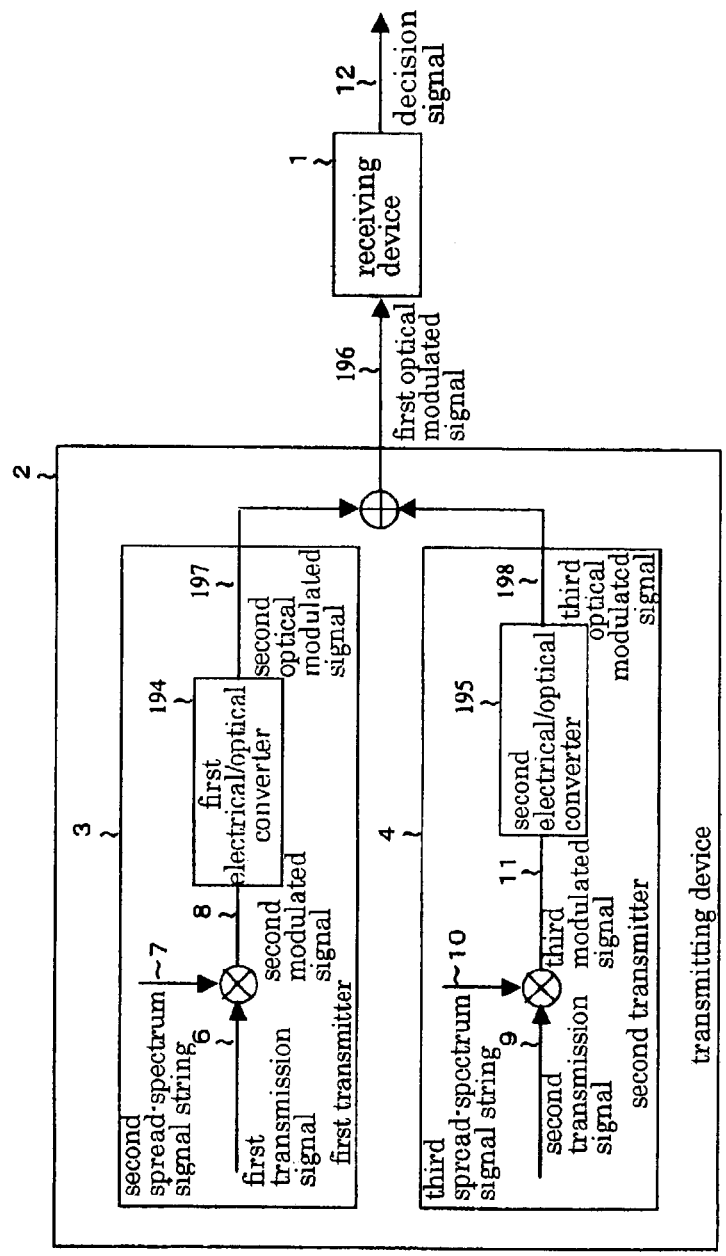
FIG. 11 is a block diagram illustrating the construction of a transmission/reception system of the fourth embodiment.

FIG. 11 illustrates the schematic construction of a transmission/reception system including the receiving device relating to the fourth embodiment. In addition to the construction of the first embodiment (including the transmitting device 2 composed of the first transmitter 3 and the second transmitter, and the receiving device 1), the schematic construction of a transmission/reception system of this embodiment is additionally provided with a first electrical/optical converter 194 on the post-stage of the first transmitter 3, and a second electrical/optical converter 195 on the post-stage of the second transmitter 4. The receiving device 1 receives an optical modulated signal 196 and applies an optical/electrical conversion, and outputs a first modulated signal. The receiving device 1 demodulates the first modulated signal by using the first spread-spectrum signal string. In the transmitting device 2, the first transmitter 3 modulates the first transmission signal 6 by using the second spread-spectrum signal string 7, and outputs a second optical modulated signal 197 having the electrical/optical conversion applied. The second transmitter 4 modulates the second transmission signal 9 by using the third spread-spectrum signal string 10, and outputs a third optical modulated signal 198 having the electrical/optical conversion applied. The optical modulated signal 196 outputted from the transmitting device 2 is a signal in which the second optical modulated signal 197 and the third optical modulated signal 198 are multiplexed. The second optical modulated signal 197 and the third optical modulated signal 198 are multiplexed by means of, for example, an optical coupler and so forth. The receiving device 1 demodulates the optical modulated signal 196, and outputs a reception signal corresponding to the first transmission signal 6 as the decision signal 12.

The first electrical/optical converter 194, by using, for example, a laser diode and light emitting diode, converts the second modulated signal 8 of the first transmitter 3 from an electrical signal into an optical signal, and outputs the second optical modulated signal 197. The second electrical/optical converter 195, by using, for example, a laser diode and light emitting diode, converts the third modulated signal 11 of the second transmitter 4 from an electrical signal into an optical signal, and outputs the third optical modulated signal 197. The optical modulated signal 196 is a signal in which the second optical modulated signal 197 and the third optical modulated signal 198 are multiplexed by means of, for example, an optical coupler and so forth.

Figure 12:
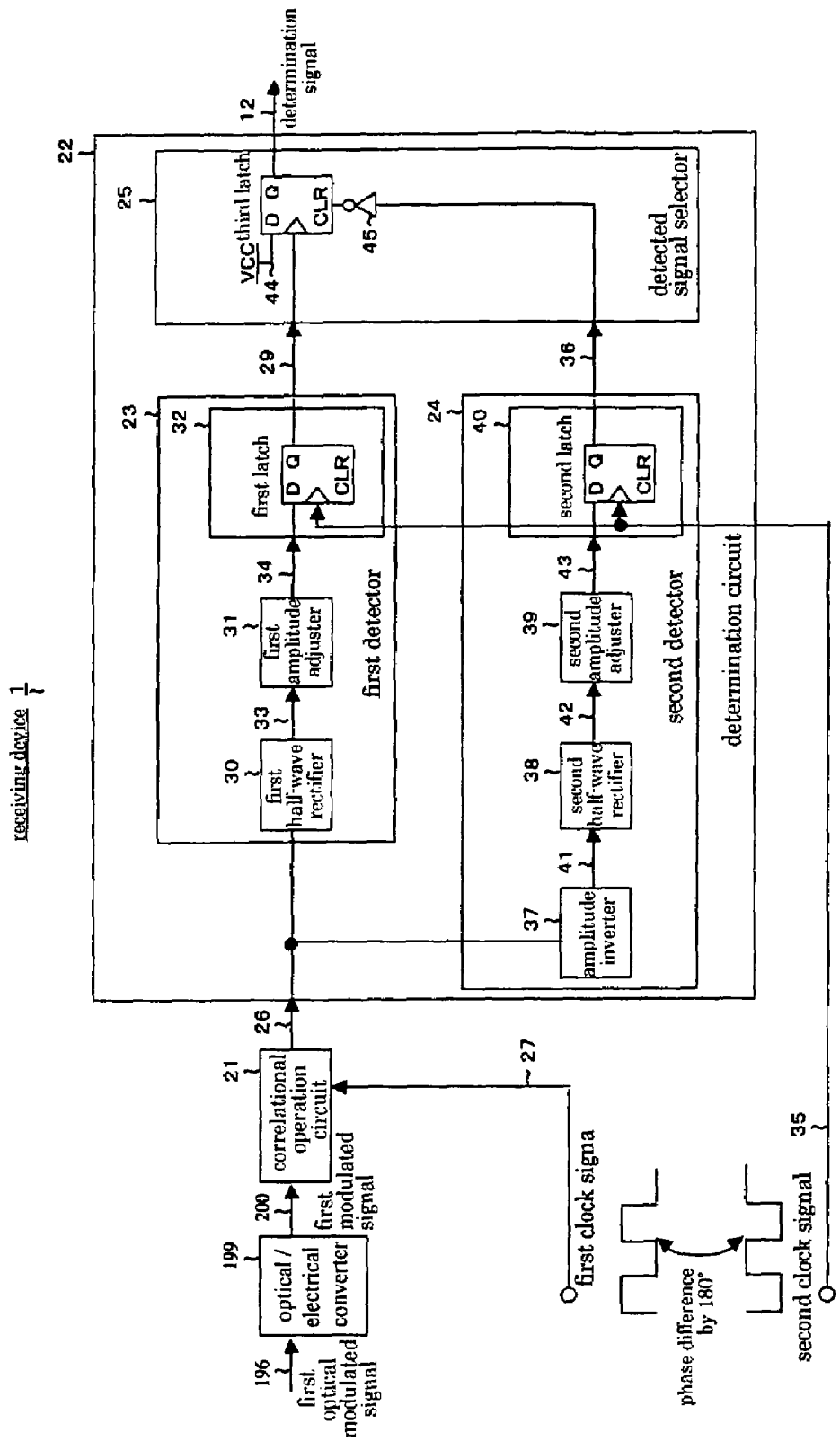
FIG. 12 is a block diagram illustrating the receiving construction of the fourth embodiment.
Figure 13:
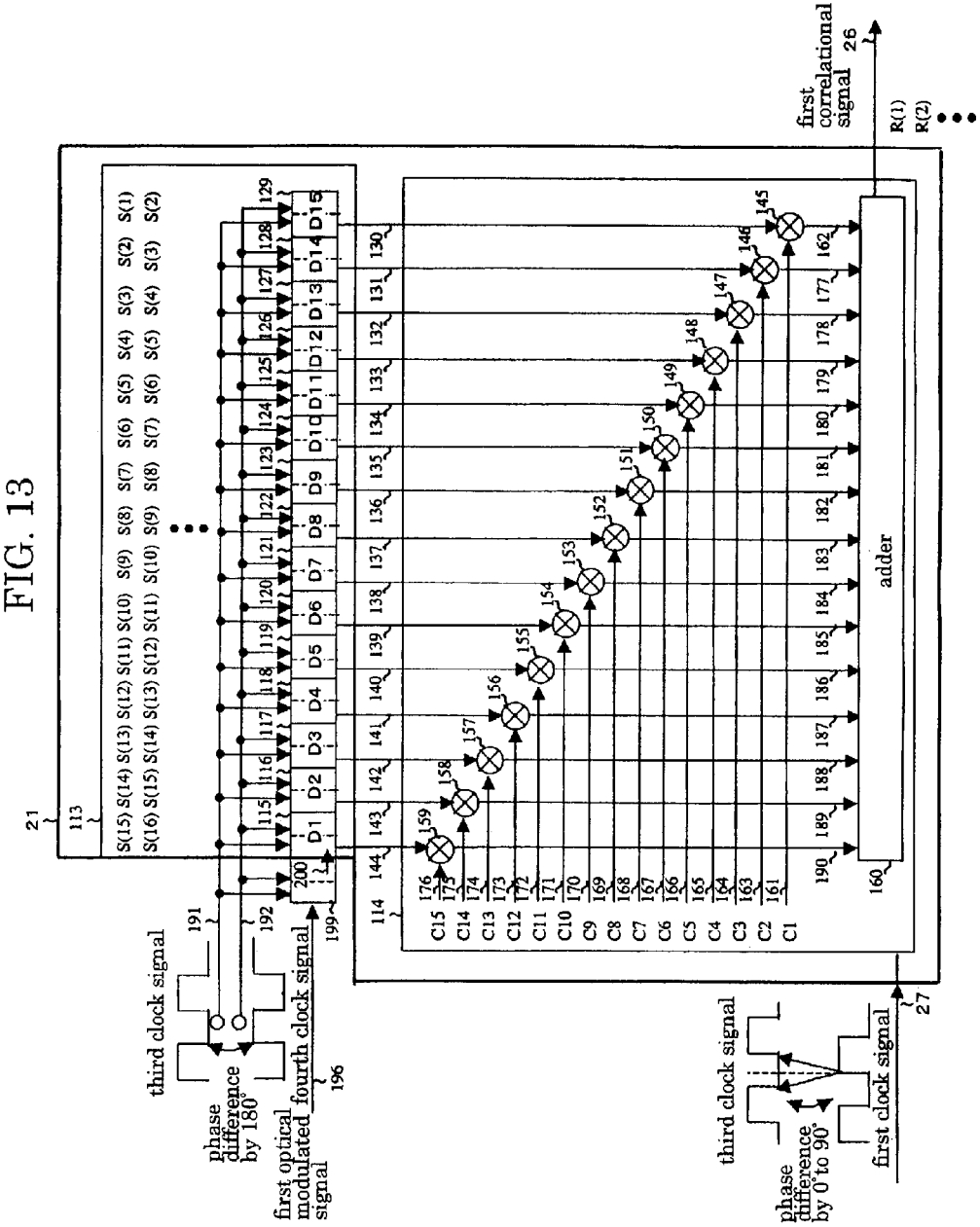
FIG. 13 is a block diagram illustrating the correlational operation circuit and photo/electric converter of the fourth embodiment.

FIG. 12 illustrates the whole construction of the receiving device relating to the fourth embodiment. In addition to the construction of the first embodiment (including the correlational operation circuit 21 and the decision circuit 22), the whole construction of the receiving device of this embodiment is additionally provided with an optical/electrical converter 199 on the pre-stage of the correlational operation circuit 21. The correlational operation circuit 21 includes, in the same manner as the third embodiment, plural shift registers: the first shift register [D1] 115, . . . , and a 15-th shift register [D15] 129, as shown in FIG. 13. The correlational operation circuit 21 possesses the delay unit 113 formed of a CCD that stores and delays a first modulated signal 200 having the optical modulated signal 196 converted from an optical signal into an electrical signal by the number of signals contained in one cycle of the first spread-spectrum signal string. The correlational operation circuit 21 multiplies each delayed signals (15 pieces of signals) contained in one cycle of the first modulated signal 200 being stored and delayed: the first delayed signal 130, . . . , and the 15-th delayed signal 144 by each spread-spectrum signals of the first spread-spectrum signal string: the first spread-spectrum signal 161, the second spread-spectrum signal 163, . . . , and the 15-th spread-spectrum signal 176. This multiplication is performed by means of the multipliers: the first multiplier 145, and the 15-th multiplier 159, which are contained in the arithmetic operation unit 114. Each multiplied signals (15 pieces of signals) contained in one cycle: the first multiplied signal 162, the second multiplied signal 177, . . . , and the 15-th multiplied signal 190 are added by means of the adder 160, which is also contained in the arithmetic operation unit 114. The correlational operation circuit 21 is composed of the delay unit 113 and the arithmetic operation unit 114. Hereunder, the total construction of the receiving device will be described only for the parts different from the third embodiment.

The optical/electrical converter 199 is formed of a photodiode or a CCD. The optical/electrical converter 199 inputs the first optical modulated signal 196, and the optical/electrical converter 199 converts the inputted optical modulated signal 196 into an electrical signal and outputs the converted modulated signal as the first modulated signal 200.

(D-2) Operation of the Fourth Embodiment

Figure 14:
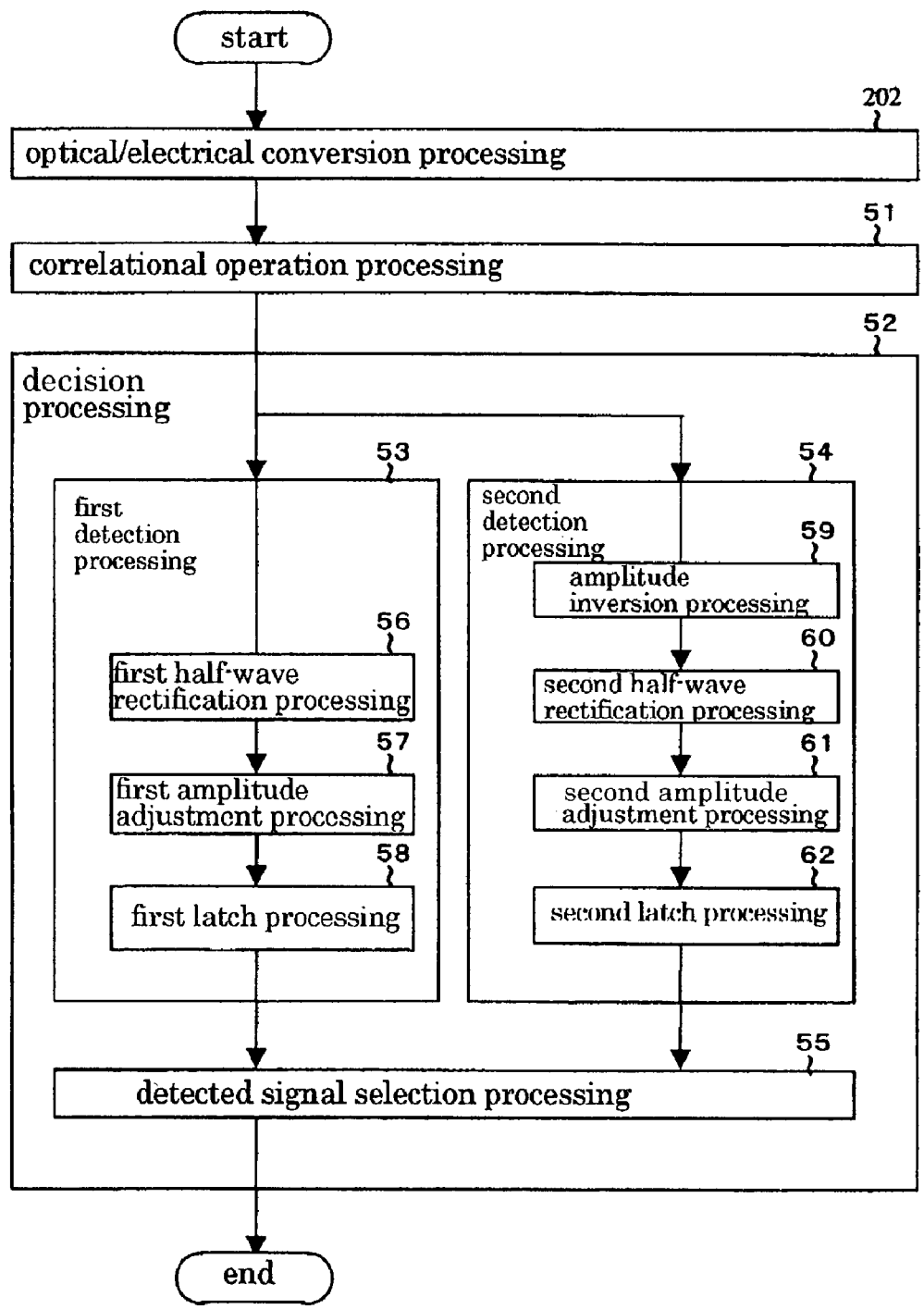
FIG. 14 is a flow chart illustrating the receiving processing of the fourth embodiment.

Next, the reception operation of the invention will be described. FIG. 14 is a flow chart illustrating the whole operation of the receiving device of the fourth embodiment.

The whole operation of the receiving device is formed of the correlational operation processing 51 and the decision processing 52, which is the same as the first embodiment, and an optical/electrical conversion processing 201 in addition. And, the correlational operation processing 51 uses the delay unit 113 formed of a CCD (FIG. 13), which is the same as the operation of the third embodiment. The correlational operation processing 51 inputs the first modulated signal 200 (FIG. 12) generated by the optical/electrical conversion processing 201 instead of the first modulated signal 5, executes the processing in the same manner as the third embodiment, and outputs the first correlational signal 26 (FIG. 12). The decision processing 52 is composed of the first detection processing 53, the second detection processing 54, and the detected signal selection processing 55, which is the same as the first embodiment. Hereunder, the whole operation of the receiving device will be mentioned only for the different processing from the first and third embodiments.

S5) Optical/Electrical Conversion Processing

The optical/electrical conversion processing 201 (FIG. 14) uses the optical/electrical converter 199 in FIG. 12. The optical/electrical conversion processing 201 inputs the first optical modulated signal 196 of an optical signal, and converts the optical signal into an electrical signal. The optical/electrical conversion processing 201 outputs the first modulated signal 200 of the electrical signal to the correlational operation circuit 21. If the optical/electrical converter 199 is formed of a CCD, the optical/electrical converter 199 and the delay unit 113 also formed of a CCD of the correlational operation circuit 21 will be integrated as shown in FIG. 13. In the same manner as the third embodiment, the optical/electrical converter 199 inputs the third clock signal 191 and the fourth clock signal 192. The optical/electrical converter 199 stores and delays the first modulated signal 200 having the first optical modulated signal 196 converted into the electrical signal in the same manner as the delay unit 113 formed of a CCD, and the optical/electrical converter 199 transfers the delayed electrical signal to the delay unit 113. The third clock signal 191 is inputted to the left area of the optical/electrical converter 199, which is located on the input side of the first optical modulated signal 196. The fourth clock signal 192 is inputted to the right area of the optical/electrical converter 199, which is located on the output side of the first modulated signal 200. The optical/electrical converter 199 converts the first optical modulated signal 196 being the optical signal into the electrical signal in the area that is located on the left of the optical/electrical converter 199, where the first optical modulated signal 196 is inputted, thus generating the first modulated signal of the electrical signal. The first modulated signal thus generated is transferred by the third clock signal 191 and the fourth clock signal 192, and is outputted as the first modulated signal 200 of the electrical signal. The first modulated signal is transferred in a manner to enhance the charge potential of the left area of the optical/electrical converter 199: the input area of the first optical modulated signal 196 (or the right area of the optical/electrical converter 199: the output area of the first modulated signal 200), and to lower the charge potential of the right area of the optical/electrical converter 199: the output area of the first modulated signal 200 (or the left area of the optical/electrical converter 199: the input area of the first optical modulated signal 196).

(D-3) Effect of the Fourth Embodiment

The fourth embodiment provides the optical/electrical converter before the correlational operation circuit. Thereby, the electrical modulated signal can be converted into the optical modulated signal, which permits receiving mass information.

(E) Construction of Modified Example

The construction of the receiving device 1 described in the third embodiment is applicable to the second embodiment.

Also, the construction of the receiving device 1 described in the fourth embodiment is applicable to the second embodiment.

And, the construction of the receiving device 1 in which the optical/electrical converter 199 described in the fourth embodiment is formed of a photo diode (PD) is applicable to the fourth embodiment.

What is claimed is:

1. A receiving device that receives a first modulated signal having a spread-spectrum modulation applied, and outputs a determination signal, the receiving device comprising:
  a correlational operation circuit that executes a correlational operation between the first modulated signal and a first spread-spectrum signal string, and outputs a first correlational signal; and
  a determination circuit that determines an amplitude value of the first correlational signal, and outputs the determination signal, the determination circuit including:
    a first detector that outputs a first detection signal, when the first detector detects that a value of the first modulated signal exceeds a first threshold value, a second detector that outputs a second detection signal, when the second detector detects that a value of the second modulated signal exceeds a second threshold value, a detected signal selector that outputs the determination signal of a first value, when the first detection signal is inputted, and outputs the determination signal of a second value, when the second detection signal is inputted, a first half-wave rectifier located on a pre-stage of the first detector, and an amplitude inverter and a second half-wave rectifier located on a pre-stage of the second detector, wherein the first half-wave rectifier applies a half-wave rectification to the first correlational signal, and outputs a first half-wave rectified signal to the first detector, wherein the amplitude inverter inverts the amplitude value of the first correlational signal, and outputs a second correlational signal, wherein the second half-wave rectifier applies the half-wave rectification to the second correlational signal, and outputs a second half-wave rectified signal to the second detector, and wherein the second detector outputs the second detection signal when the second detector detects that a value of the second half-wave rectified signal exceeds the first threshold value.

2. A receiving device according to claim 1, wherein:
the first detector includes:
a first amplitude adjuster that adjusts an amplitude value of the first half-wave rectified signal, and outputs a first adjusted signal; and
a first latch that synchronizes with a specified clock signal, latches a first signal of the first value when a value of the inputted first adjusted signal becomes equal to the first threshold value or more, latches a first signal of the second value when a value of the first adjusted signal becomes less than the first threshold value, and outputs the latched first signal as the first detection signal;
and the second detector includes:
a second amplitude adjuster that adjusts an amplitude value of the second half-wave rectified signal, and outputs a second adjusted signal; and
a second latch that synchronizes with a specified clock signal, latches a second signal of the first value when a value of the inputted second adjusted signal becomes equal to the first threshold value or more, latches a second signal of the second value when a value of the second adjusted signal becomes less than the first threshold value, and outputs the latched second signal as the second detection signal;
and the detected signal selector includes a third latch that inputs a third signal of the first value, latches a fourth signal of the first value, when the first detection signal is inputted as a clock signal, latches a fourth signal of the second value, when the second detection signal is inputted as a reset signal, and outputs the latched fourth signal as the determination signal.

3. A receiving device according to claim 2, wherein the first detector further includes a first Schmidt trigger circuit located between the first amplitude adjuster and the first latch, and the second detector further includes a second Schmidt trigger circuit located between the second amplitude adjuster and the second latch, wherein:

the first Schmidt trigger circuit: possesses a third threshold value and a fourth threshold value that is lower than the third threshold value; generates a fifth signal of the first value, when a value of the first adjusted signal becomes equal to or higher than the third threshold, and the value of the first adjusted signal becomes equal to or higher than the fourth threshold; generates a fifth signal of the second value, when the value of the first adjusted signal becomes lower than the fourth threshold, and the value of the first adjusted signal becomes lower than the third threshold; and outputs the generated fifth signal to the first latch as a first Schmidt trigger signal;

and the second Schmidt trigger circuit: possesses the third threshold value and the fourth threshold value; generates a sixth signal of the first value, when a value of the second adjusted signal becomes equal to or higher than the third threshold, and the value of the second adjusted signal becomes equal to or higher than the fourth threshold; generates a sixth signal of the second value, when the value of the second adjusted signal becomes lower than the fourth threshold, and the value of the second adjusted signal becomes lower than the third threshold; and outputs the generated sixth signal to the second latch as a second Schmidt trigger signal.

4. A receiving device according to claim 1, wherein the correlational operation circuit formed of plural shift registers includes:
a delay unit that stores and delays the first modulated signal by the number of signals contained in one cycle of the first spread-spectrum signal string; and
an arithmetic operation unit that multiplies each delayed signals of the first modulated signal by each spread-spectrum signals of the first spread-spectrum signal string for the number of signals contained in one cycle, adds each multiplied signals for the number of signals contained in one cycle, and outputs a sum of added signals as the first correlational signal.

5. A receiving device according to claim 4, wherein the delay unit is formed of a first charge coupled device.

6. A receiving device according to claim 1, further comprising a preprocessing circuit, wherein:
the preprocessing circuit preprocesses the first modulated signal in a manner that the maximum power of the first modulated signal becomes a specified value, and outputs a preprocessed signal to the correlational operation circuit.

7. A receiving device according to claim 1, further comprising an optical/electrical converter located on a pre-stage of the correlational operation circuit, wherein:
the optical/electrical converter inputs a first optical modulated signal of an optical signal to convert it into an electrical signal, and outputs a converted signal to the correlational operation circuit as the first modulated signal.

8. A receiving device according to claim 7, wherein the optical/electrical converter is formed of a second charge coupled device.

* * * * *